(12) United States Patent
Kato

(10) Patent No.: US 10,489,049 B2
(45) Date of Patent: Nov. 26, 2019

(54) IMAGE PROCESSING APPARATUS, IMAGE PROCESSING SYSTEM, AND IMAGE PROCESSING METHOD

(71) Applicant: Yoshinaga Kato, Kanagawa (JP)

(72) Inventor: Yoshinaga Kato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/051,831

(22) Filed: Aug. 1, 2018

(65) Prior Publication Data

US 2018/0341385 A1 Nov. 29, 2018

Related U.S. Application Data

(63) Continuation of application No. PCT/JP2016/085712, filed on Dec. 1, 2016.

(30) Foreign Application Priority Data

Feb. 12, 2016 (JP) .................................. 2016-025360

(51) Int. Cl.
*G06F 3/0488* (2013.01)
*H04N 1/21* (2006.01)
(Continued)

(52) U.S. Cl.
CPC ........ *G06F 3/0488* (2013.01); *G06F 3/03545* (2013.01); *H04N 1/00* (2013.01); *H04N 1/21* (2013.01); *H04N 1/387* (2013.01)

(58) Field of Classification Search
CPC combination set(s) only.
See application file for complete search history.

(56) References Cited

U.S. PATENT DOCUMENTS 9,098,947 B2   8/2015  Kemmochi
9,754,559 B2   9/2017  Emori et al.
(Continued)

FOREIGN PATENT DOCUMENTS

JP   H04-207451   7/1992
JP   2004-015619  1/2004
(Continued)

OTHER PUBLICATIONS

International Search Report dated Feb. 21, 2017 in PCT/JP2016/085712 filed on Dec. 1, 2016.
(Continued)

*Primary Examiner* — Helen Zong
(74) *Attorney, Agent, or Firm* — IPUSA, PLLC

(57) ABSTRACT

An image processing apparatus for performing image processing on a superimposed image in which a plurality of images are superimposed, the image processing apparatus including processing circuitry configured to generate the superimposed image by superimposing at least a stroke image and a background image; determine whether a storage destination, which is for storing image data indicating the superimposed image, is an external device coupled to the image processing apparatus; and compress background image data indicating the background image among the image data, and to refrain from compressing stroke image data indicating the stroke image among the image data, in response to the storage destination being determined to be the external device.

14 Claims, 13 Drawing Sheets

(51) Int. Cl.
*H04N 1/00* (2006.01)
*H04N 1/387* (2006.01)
*G06F 3/0354* (2013.01)

(56) References Cited

U.S. PATENT DOCUMENTS

| | | | | |
|---|---|---|---|---|
| 2011/0080947 | A1* | 4/2011 | Chen | H04N 19/13 |
| | | | | 375/240.12 |
| 2011/0083092 | A1* | 4/2011 | Ito | G05B 19/4063 |
| | | | | 715/771 |
| 2012/0299881 | A1* | 11/2012 | De Muelenaere | G06F 3/038 |
| | | | | 345/179 |
| 2015/0077369 | A1 | 3/2015 | Nagahara et al. | |
| 2015/0153927 | A1 | 6/2015 | Kashibuchi | |
| 2016/0259557 | A1* | 9/2016 | Yang | G06F 3/0608 |
| 2016/0267006 | A1* | 9/2016 | Garanzha | G06F 12/0802 |
| 2016/0371105 | A1* | 12/2016 | Sieffert | G06F 9/45545 |
| 2017/0039372 | A1* | 2/2017 | Koval | G01D 4/004 |
| 2019/0019296 | A1* | 1/2019 | Watanabe | G06T 7/20 |

FOREIGN PATENT DOCUMENTS

| | | |
|---|---|---|
| JP | 2006-239944 | 9/2006 |
| JP | 2013-210957 | 10/2013 |
| JP | 2013-247545 | 12/2013 |
| JP | 2015-069284 | 4/2015 |
| JP | 2015-084211 | 4/2015 |
| TW | 426813 | 3/2001 |

OTHER PUBLICATIONS

Extended European Search Report for 16889934.2 dated Dec. 7, 2018.
Chinese Office Action for 201680081113.6 dated Jun. 3, 2019.

\* cited by examiner

FIG.6
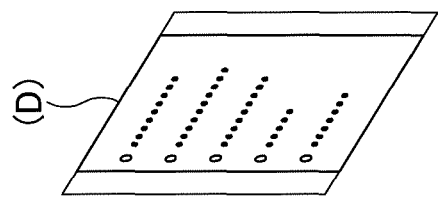
(D)
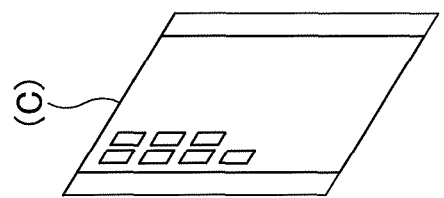
(C)
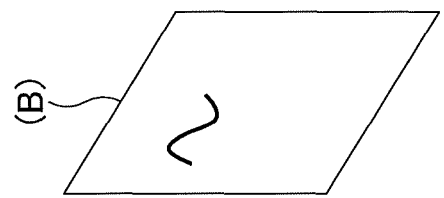
(B)
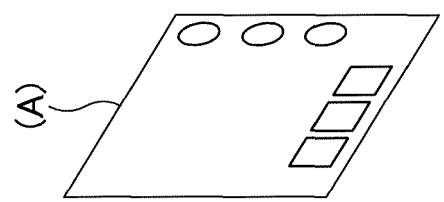
(A)
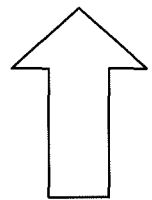
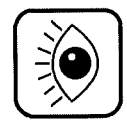

FIG.13

- PLEASE INPUT CONFERENCE CODE

STORAGE PERIOD: 14 DAYS
STORAGE EXPIRATION DATE: 2016-01-29

CONFERENCE CODE (FROM 4 DIGITS TO 10 DIGITS):

1111 — COD

| 1 | 2 | 3 |
| 4 | 5 | 6 |
| 7 | 8 | 9 |
| 0 | ↓ |

TEMPORARILY STORE

CANCEL

CPL

IMAGE PROCESSING APPARATUS, IMAGE PROCESSING SYSTEM, AND IMAGE PROCESSING METHOD

CROSS-REFERENCE TO RELATED APPLICATION

The present application is a continuation application of International Application No. PCT/JP2016/085712 filed on Dec. 1, 2016, which claims priority to Japanese Patent Application No. 2016-025360 filed on Feb. 12, 2016. The contents of these applications are incorporated herein by reference in their entirety.

BACKGROUND OF THE INVENTION

1. Field of the Invention

The present invention relates to an image processing apparatus, an image processing system, and an image processing method.

2. Description of the Related Art

In the related art, in a conference, etc., in a company, an educational institution, and an administrative agency, etc., an electronic blackboard is used, in which a background image is displayed on a large display, and a user can draw a stroke image such as letters, numbers, and figures, etc., on the background image.

As an example of such an electronic blackboard, for example, the following image processing apparatus is known from Patent Literature 1. First, an image processing apparatus such as an electronic blackboard directly acquires a display image from an information processing apparatus, and generates a drawing image using a contact position or an approach position of an object with respect to a display device. Next, the image processing apparatus combines the display image and the drawing image to generate a combined image, and then displays the combined image on the display device. Subsequently, the image processing apparatus stores display information for recording and storing display information for recombining and redisplaying the display image and the drawing image. Then, when content data is received from any information processing apparatus via a network, the image processing apparatus converts the content of content data into image data, generates display information based on the image data, and stores the display information. In this way, there is known an image processing apparatus that freely adds a page for using content data, which is stored in a notebook personal computer (PC) or mobile terminal of a conference participant, as a background image.

Patent Literature 1: Japanese Unexamined Patent Application Publication No. 2013-210957

SUMMARY OF THE INVENTION

An aspect of the present invention provides an image processing apparatus for performing image processing on a superimposed image in which a plurality of images are superimposed, the image processing apparatus including processing circuitry configured to generate the superimposed image by superimposing at least a stroke image and a background image; determine whether a storage destination, which is for storing image data indicating the superimposed image, is an external device coupled to the image processing apparatus; and compress background image data indicating the background image among the image data, and to refrain from compressing stroke image data indicating the stroke image among the image data, in response to the storage destination being determined to be the external device.

BRIEF DESCRIPTION OF THE DRAWINGS

FIG. 6 illustrates a configuration of an example of image layers according to an embodiment of the present invention;

FIG. 13 is an example of a diagram illustrating a code input screen for inputting a code according to an embodiment of the present invention.

DETAILED DESCRIPTION OF THE PREFERRED EMBODIMENTS

In the related art, there are cases where the image processing apparatus generates image data, etc., and stores the generated image data, etc., in an external device, etc., connected to the image processing apparatus. In this case, there is a problem that the data volume of image data, etc., to be stored in the external device becomes large.

A problem to be solved by an embodiment of the present invention is to reduce the data volume of image data, etc., to be stored in an external device.

Hereinafter, one embodiment of the present invention will be described with reference to the drawings.

<Overview of System>

Figure 1:
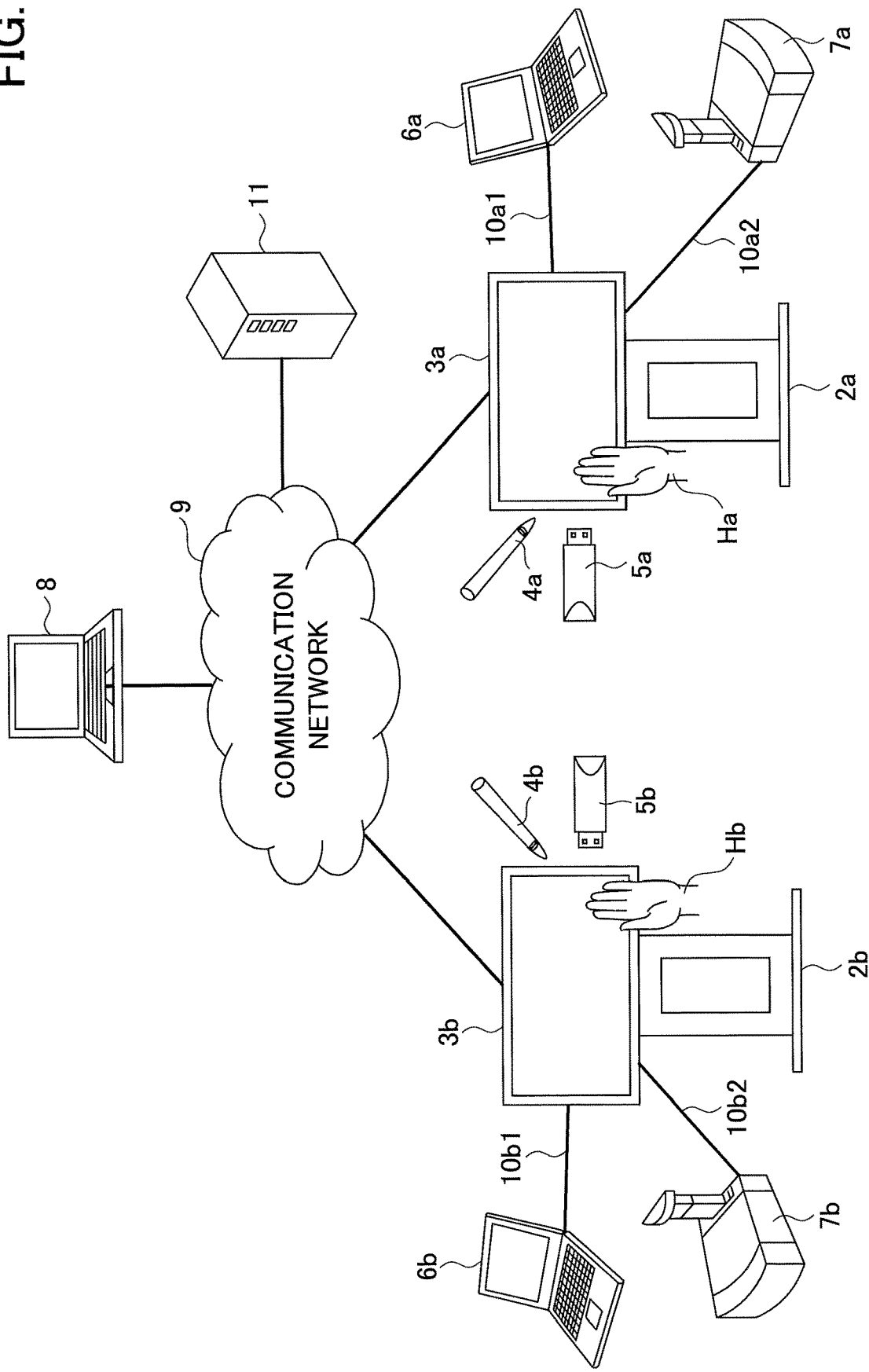
FIG. 1 is an overall configuration diagram of an example of an image processing system according to an embodiment of the present invention.

FIG. 1 is an overall configuration diagram of an example of an image processing system according to the present embodiment. In FIG. 1, for the sake of simplifying the descriptions, only two electronic blackboards 2a and 2b and two electronic pens 4a and 4b, etc., respectively associated with the electronic blackboards are illustrated; however, three or more electronic blackboards or electronic pens, etc., may be used.

As illustrated in FIG. 1, an image processing system 1 includes a plurality of the electronic blackboards 2a and 2b, a plurality of the electronic pens 4a and 4b, Universal Serial Bus (USB) memories 5a and 5b, notebook personal computers (PCs) 6a and 6b, TV (video) conference terminals 7a and 7b, and a PC 8. Furthermore, the electronic blackboards 2a and 2b and the PC 8 are communicably connected via a communication network 9. Furthermore, the plurality of electronic blackboards 2a and 2b are provided with displays 3a and 3b, respectively.

Furthermore, the electronic blackboard 2a may display, on the display 3a, an image drawn according to an event generated by the electronic pen 4a (the pen tip of the electronic pen 4a or the pen bottom of the electronic pen 4a touching the display 3a). Note that the electronic blackboard 2a may change an image displayed on the display 3a, not only based on an event generated by the electronic pen 4a, but also based on an event generated by a hand Ha of the user, etc. (a gesture such as enlargement, reduction, and page turning, etc.).

Furthermore, the USB memory 5a can be connected to the electronic blackboard 2a. The electronic blackboard 2a can read electronic files such as a Portable Document Format (PDF) file from the USB memory 5a, and the electronic blackboard 2a can store electronic files in the USB memory 5a. Furthermore, to the electronic blackboard 2a, the notebook PC 6a is connected via a cable 10a1 capable of communication according to standards such as DisplayPort, Digital Visual Interface (DVI), High-Definition Multimedia Interface (HDMI) (registered trademark), and Video Graphics Array (VGA). The electronic blackboard 2a generates an event according to the display 3a being touched, and transmits event information indicating the generated event, to the notebook PC 6a, similar to an event from an input device such as a mouse or a keyboard, etc. Similarly, to the electronic blackboard 2a, the TV (video) conference terminal 7a is connected via a cable 10a2 capable of communicating according to the above standards. Note that the notebook PC 6a and the TV (video) conference terminal 7a may communicate with the electronic blackboard 2a by wireless communication compliant with various wireless communication protocols such as Bluetooth (registered trademark).

On the other side, at another site where the electronic blackboard 2b is installed, similar to the above, the electronic blackboard 2b having the display 3b, the electronic pen 4b, the USB memory 5b, the notebook PC 6b, the TV (video) conference terminal 7b, a cable 10b1, and a cable 10b2 are used. Furthermore, the electronic blackboard 2b can change the image displayed on the display 3b based on the event generated by the user's hand Hb, etc.

Accordingly, an image drawn on the display 3a included in the electronic blackboard 2a at a certain site is also displayed on the display 3b included in the electronic blackboard 2b at another site. Conversely, an image drawn on the other display 3b included in the electronic blackboard 2b at the other site is also displayed on the display 3a included in the electronic blackboard 2a at one site. As described above, the image processing system 1 can perform a remote sharing process of sharing the same image at remote locations, and therefore the image processing system 1 is convenient when used for a conference held at remote locations, etc.

<Terms>

Note that in the following examples, when any electronic blackboard is indicated among a plurality of electronic blackboards, the electronic blackboard is referred to as "the electronic blackboard 2". Furthermore, when any display is indicated among a plurality of displays, the display is referred to as "the display 3". Furthermore, when any electronic pen is indicated among a plurality of electronic pens, the electronic pen is referred to as "the electronic pen 4". Furthermore, when any USB memory is indicated among a plurality of USB memories, the USB memory is referred to as "the USB memory 5". Furthermore, when any notebook PC is indicated among a plurality of notebook PCs, the notebook PC is referred to as "the notebook PC 6". Furthermore, when any TV (video) conference terminal is indicated among a plurality of TV (video) conference terminals, the TV (video) conference terminal is referred to as "the TV (video) conference terminal 7". Furthermore, when any hand is indicated among the hands of a plurality of users, the hand is referred to as "the hand H". Furthermore, when any cable is indicated among a plurality of cables, the cable is referred to as "the cable 10".

Furthermore, in the following description, an electronic blackboard will be described as an example of an image processing apparatus; however, the image processing apparatus is not limited as such. Other examples of the image processing apparatus are an electronic signboard (digital signage), a telestrator used in sports and weather forecasts, etc., or a remote image (video) diagnostic device, etc. Furthermore, although the notebook PC 6 will be described as an example of the information processing terminal; the information processing terminal is not limited as such. Other examples of the information processing terminal are terminals capable of supplying image frames such as a desktop PC, a tablet PC, a Personal Digital Assistant (PDA), a digital video camera, a digital camera, and a game console. Furthermore, the communication network includes the Internet, a Local Area Network (LAN), and a mobile phone communication network, etc. Furthermore, in order to increase security, the communication network may connect to the Internet by using Virtual Private Network (VPN). Furthermore, in the present description, a USB memory is described as an example of a recording medium. However, the recording medium is not limited as such. Other examples of the recording medium are various kinds of recording media such as a secure digital (SD) (registered trademark) card.

In the following description, an example in which the image processing apparatus is an electronic blackboard will be described; however, the present invention is not limited as such. For example, the image processing apparatus may be an information processing terminal connected to an electronic blackboard.

An image indicating a character, a figure, a number, a symbol, a line, or a combination thereof written by the user on handwriting by an electronic blackboard, is referred to as a stroke image.

<Hardware Configuration Example of Electronic Blackboard>

In the following, a hardware configuration example of the electronic blackboard according to the present embodiment will be described.

Figure 2:
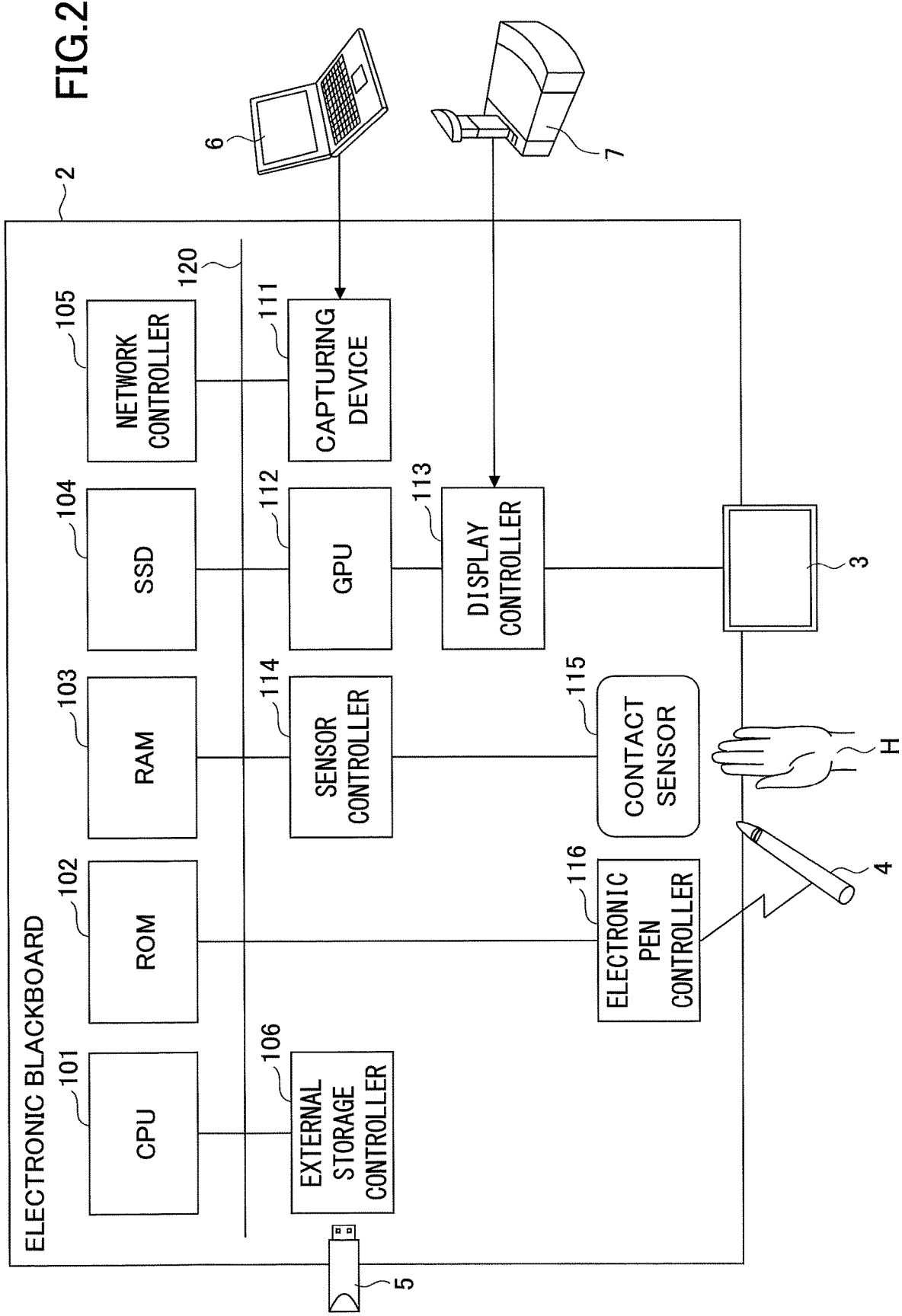
FIG. 2 is a block diagram of an example of a hardware configuration of an electronic blackboard according to an embodiment of the present invention.

FIG. 2 is a block diagram of an example of a hardware configuration of the electronic blackboard.

As illustrated, the electronic blackboard 2 includes a Central Processing Unit (CPU) 101 for controlling the operations of the entire electronic blackboard 2. Furthermore, the electronic blackboard 2 includes a Read-Only Memory (ROM) 102 storing programs used for driving the CPU 101 such as an Initial Program Loader (IPL). Furthermore, the electronic blackboard 2 includes a Random Access Memory (RAM) 103 used as a work area of the CPU 101. Furthermore, the electronic blackboard 2 includes a Solid State Drive (SSD) 104 for storing various kinds of data such as a program for the electronic blackboard 2. Furthermore, the electronic blackboard 2 includes a network controller 105 for controlling communication with the communication network 9, and an external storage controller 106 for controlling communication with an external device such as the USB memory 5.

Furthermore, the electronic blackboard 2 includes a capturing device 111 for acquiring video information as a still image or a moving image to be displayed on the display of the notebook PC 6, and displaying the acquired video information. Furthermore, the electronic blackboard 2 includes a Graphics Processing Unit (GPU) 112 that is specifically used for graphics. Furthermore, the electronic blackboard 2 includes a display controller 113 for implementing control and managing the screen display for outputting output images from the GPU 122 to the display 3 and the TV (video) conference terminal 7.

The electronic blackboard 2 further includes a sensor controller 114 for controlling the process of a contact sensor 115, and the contact sensor 115 for detecting that the electronic pen 4 or the user's hand H has touched the display 3. The contact sensor 115 performs input of coordinates and detection of coordinates by an infrared ray blocking method. In the method of inputting the coordinates and detecting the coordinates, two light receiving/emitting devices, which are installed at both upper end portions of the display 3, emit a plurality of infrared rays parallel with the display 3. Next, the infrared rays are reflected by reflecting members arranged around the display 3, and receiving elements receive the infrared rays that have returned along the same optical paths as the optical paths of the light that has been emitted. In this manner, the contact sensor 115 outputs, to the sensor controller 114, the identification (ID) of the infrared rays, which are emitted by the two light emitting/receiving devices and blocked by an object such as a hand H, etc., and the sensor controller 114 identifies the coordinate position that is the contact position of the object. Note that all of the following IDs are examples of identification information.

Furthermore, the contact sensor 115 is not limited to the infrared ray blocking method. For example, the contact sensor 115 may be a capacitive type touch panel that identifies the contact position by detecting a change in electrostatic capacity, or a resistive film type touch panel that identifies the contact position by a change in the voltage of two opposing resistive films. Also, the contact sensor 115 may be an electromagnetic induction type touch panel for detecting the electromagnetic induction caused by the contact of the contact object with the display unit to identify the contact position. That is, various kinds of detecting means may be used as the contact sensor 115.

Furthermore, the electronic blackboard 2 is provided with an electronic pen controller 116. The electronic pen controller 116 communicates with the electronic pen 4 to determine whether the pen tip or the pen bottom of the electronic pen 4 has touched the display 3. Note that the electronic pen controller 116 may not only determine whether the pen tip or the pen bottom of the electronic pen 4 has touched the display 3, but may also determine whether the part of the electronic pen 4 held by the user or other parts of the electronic pen have touched the display 3.

Furthermore, the electronic blackboard 2 includes a bus line 120 such as an address bus and a data bus, etc., for electrically connecting the CPU 101, the ROM 102, the RAM 103, the SSD 104, the network controller 105, the external storage controller 106, the capturing device 111, the GPU 112, the sensor controller 114, and the electronic pen controller 116.

Note that a program for the electronic blackboard 2 may be distributed upon being recorded in a computer-readable recording medium such as a Compact Disk Read-Only Memory (CD-ROM).

<Functional Configuration Example of Electronic Blackboard>

In the following, an example of the functional configuration of the electronic blackboard will be described. First, an example of the overall functional configuration of the electronic blackboard 2 will be described with reference to FIG. 3.

Figure 3:
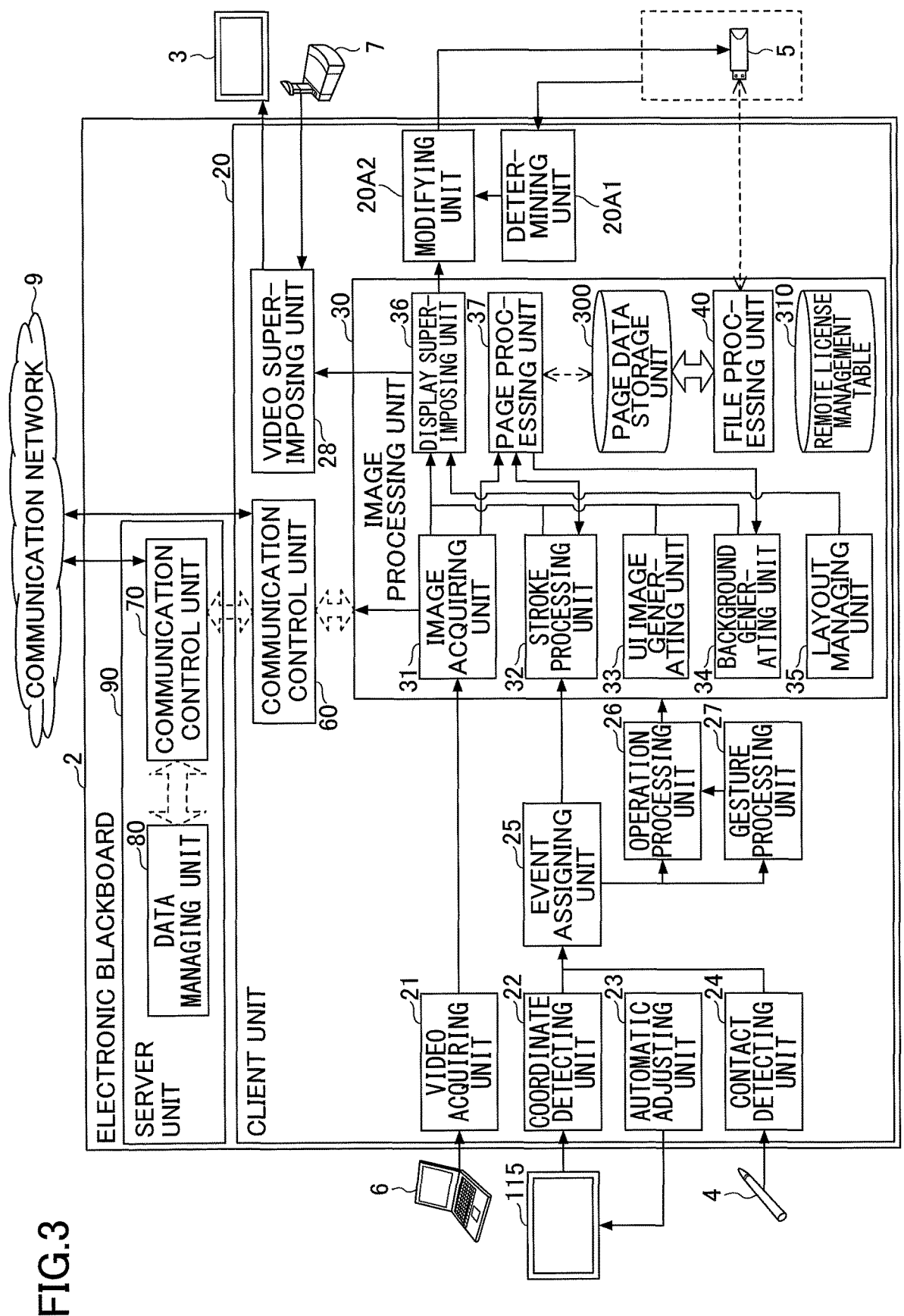
FIG. 3 is a functional block diagram illustrating an example of the functional configuration of the electronic blackboard according to an embodiment of the present invention.

FIG. 3 is a functional block diagram illustrating an example of the functional configuration of the electronic blackboard.

The electronic blackboard 2 implements the functional configurations according to the hardware configuration illustrated in FIG. 2 and programs. Note that the electronic blackboard 2 can be a "hosting device" for initially starting a remote sharing process, and the electronic blackboard 2 can also be a "participating device" to participate later in the remote sharing process already started. Thus, the electronic blackboard 2 is formed of both a client unit 20 and a server unit 90, as illustrated. Note that the client unit 20 and the server unit 90 are functions implemented in one casing of the electronic blackboard 2.

Furthermore, when the electronic blackboard 2 becomes a hosting device, the client unit 20 and the server unit 90 are implemented in this electronic blackboard 2. On the other hand, when the electronic blackboard 2 becomes a participating device, the client unit 20 is implemented in the electronic blackboard 2; however, the server unit 90 is not implemented. That is, in the example of FIG. 1, when the electronic blackboard 2a is the hosting device and the electronic blackboard 2b is the participating device, the client unit 20 of the electronic blackboard 2a communicates, via the server unit 90 implemented in the same electronic blackboard 2a, with the client unit 20 of the other electronic blackboard 2b. On the other side, the client unit 20 of the electronic blackboard 2b communicates with the client unit 20 of the other electronic blackboard 2a, via the server unit 90 implemented in the other electronic blackboard 2a.

[Functional Configuration Example of Client Unit 20]

Next, an example of the functional configuration, of the client unit 20 will be described mainly with reference to FIGS. 3 through 5. As illustrated in FIG. 3, the client unit 20 includes a video acquiring unit 21, a coordinate detecting unit 22, an automatic adjusting unit 23, a contact detecting unit 24, an event assigning unit 25, an operation processing unit 26, a gesture processing unit 27, a video superimposing unit 28, an image processing unit 30, and a communication control unit 60.

Among these elements, the video acquiring unit 21 acquires an output video that is output from a video output device connected to the cable 10. Upon receiving image signals from a video output device, the video acquiring unit 21 analyzes the image signals to derive the resolution of the image frame that is the display image of the video output device formed by the image signals, or to derive image information such as the frequency of updating the image frame, and outputs this information to an image acquiring unit 31.

The coordinate detecting unit 22 detects the coordinate position of an event caused by the user's operation on the display 3 (such as an action of the user's hand H touching the display 3). Furthermore, the coordinate detecting unit 22 may also detect the area of the touched portion.

The automatic adjusting unit 23 is activated when the electronic blackboard 2 is activated, for example. Then, the automatic adjusting unit 23 enables the contact sensor 115 (FIG. 2) to output coordinate values, etc., to the coordinate detecting unit 22. Specifically, the automatic adjusting unit 23 adjusts parameters, etc., used for image processing by the sensor camera used in an optical sensor method performed by the contact sensor 115.

The contact detecting unit 24 detects an event caused by the user's operation (an action in which the pen tip of the electronic pen 4 or the pen bottom of the electronic pen 4 is pressed on (touches) the display 3).

The event assigning unit 25 assigns the coordinate position of an event detected by the coordinate detecting unit 22 and the detection result detected by the contact detecting unit 24, to each of the events including stroke drawing, a UI operation, and a gesture operation. For example, when an event occurs, an image is generated according to the event, and the image forms the following layers.

FIG. 6 illustrates a configuration of an example of image layers.

Note that a "stroke drawing" is an event performed when a stroke image (B) illustrated in FIG. 6 is displayed on the display 3 (FIG. 3). For example, the "stroke drawing" is an event in which the user presses down the electronic pen 4 (FIG. 3) on the display 3, and next, moves the electronic pen 4 in the pressed state, and finally releases the electronic pen 4 from the display 3 after moving. By this stroke drawing, for example, an alphabetical letter "S" or "T", etc., is drawn on the display 3 by the electronic blackboard 2. Note that this "stroke drawing" does not only include drawing an image, but also includes the events of deleting an image already drawn or editing a drawn image.

The "UI operation" is an event performed when a UI image (A) illustrated in FIG. 6 is displayed on the display 3. For example, the "UI operation" is an event in which the user presses a predetermined position with the electronic pen 4 or the hand H. By this "UI operation", for example, the color or width of the lines drawn by the electronic pen 4 are set.

The "gesture operation" is an event performed when a stroke image (B) illustrated in FIG. 6 is displayed on the display 3. For example, the "gesture operation" is an event in which the user touches the display 3 with the hand H or moves the hand H on the display 3. By this gesture operation, for example, the electronic blackboard can enlarge (or reduce) an image, change the display area, or switch pages, etc., by moving the hand H while the user is touching the display 3 with the hand H.

Referring back to FIG. 3, the operation processing unit 26 executes processes according to various operations, based on elements of the UI that have been the targets of "UI operation", when the event assigning unit 25 determines that the event is a "UI operation. Note that examples of elements of the UI include graphical user interfaces (GUIs) such as buttons, lists, check boxes, and text boxes.

The gesture processing unit 27 executes a process corresponding to the type of an input "gesture" operation, when the event assigning unit 25 determines that the event is a "gesture operation".

The video superimposing unit 28 outputs an image superimposed by a display superimposing unit 36, to the video output device (the display 3, etc.). Furthermore, the video superimposing unit 28 performs a picture-in-picture operation to superimpose, on a video from a video output device (the notebook PC 6, etc.), a video sent from another video output device (such as the TV (video) conference terminal 7). Furthermore, the video superimposing unit 28 performs a switching operation such that a video obtained by the picture-in-picture operation, which is displayed on a part of the display 3, is displayed on the entire display 3.

The image processing unit 30 performs image processing of such as a process of superimposing the respective image layers, etc., as illustrated in FIG. 6, for example. That is, an image generated by the superimposing process (hereinafter, "superimposed image") is an image indicating a plurality of images that are superimposed. Furthermore, the image processing unit 30 includes the image acquiring unit 31, a stroke processing unit 32, a UI image generating unit 33, a background generating unit 34, a layout managing unit 35, the display superimposing unit 36, a page processing unit 37, a file processing unit 40, a page data storage unit 300, and a remote license management table 310.

The image acquiring unit 31 acquires each frame as an image from the video acquired by the video acquiring unit 21. Furthermore, the image acquiring unit 31 outputs the data of the image to the page processing unit 37. This image is an output image from the video output device (the notebook PC 6, etc.), and corresponds to an output image (C) illustrated in FIG. 6.

The stroke processing unit 32 draws an image, deletes the drawn image, and edits the drawn image, when an event of "stroke drawing" assigned by the event assigning unit 25 occurs. The image created by "stroke drawing" corresponds to the stroke image (B), etc., illustrated in FIG. 6, for example. Furthermore, the results of drawing, deleting, and editing of images based on the "stroke drawing", are stored, as operation data, in an operation data storage unit 840 (FIG. 5).

The UI image generating unit 33 generates a User Interface (UI) image set in advance in the electronic blackboard 2. Note that this UI image corresponds to the UI image (A) illustrated in FIG. 6.

The background generating unit 34 receives, from the page processing unit 37, the media data of the page data read from the page data storage unit 300 by the page processing unit 37. Furthermore, the background generating unit 34 outputs the received media data to the display superimposing unit 36. Note that the image based on this media data corresponds to a background image (D) illustrated in FIG. 6. Furthermore, the background image (D) is an image indicating a plain image or a grid display, etc. Furthermore, the background image (D) may be a captured image, etc. That is, the background image (D) may be an image indicating a document or a presentation material, etc. Furthermore, the background image data is data indicating the background image (D).

Note that in the superimposed image generated by superimposing the stroke image (C) and the background image (D), the stroke image (C) is before the background image (D) (left side in FIG. 6). Therefore, in the superimposed image, handwritten characters, etc., indicated by the stroke image are displayed in front of the material, etc., indicated by the background image.

The layout managing unit 35 manages, with respect to the display superimposing unit 36, the layout of each image output from the image acquiring unit 31, the stroke processing unit 32, and the UI image generating unit 33 (or the background generating unit 34). Accordingly, the layout managing unit 35 is able to send an instruction to the display superimposing unit 36, as to the positions of displaying the output image (C) and the stroke image (B), in the UI image (A) and the background image (D), or to not display the output image (C) or the stroke image (B).

Based on the layout instruction output from the layout managing unit 35, the display superimposing unit 36 lays out each image output from the image acquiring unit 31, the stroke processing unit 32, and the UI image generating unit 33 (the background generating unit 34).

For example, the page processing unit 37 integrates the data of the stroke image (B) and the data of the output image (C) into a single piece of page data, and stores the page data in the page data storage unit 300. Note that the data of the stroke image (B) forms part of the page data, as stroke arrangement data (pieces of stroke data) indicated by a stroke arrangement data ID. The data of the output image (C)

forms part of the page data, as media data indicated by a media data ID. Then, when this media data is read from the page data storage unit 300, the media data is handled as data of the background image (D).

Furthermore, the page processing unit 37 transmits the media data of the stored page data, to the display superimposing unit 36 via the background generating unit 34. Accordingly, the video superimposing unit 28 can redisplay the background image (D) on the display 3. Furthermore, the page processing unit 37 can return the stroke arrangement data (pieces of stroke data) of the page data, to the stroke processing unit 32, so that the stroke can be reedited. Furthermore, the page processing unit 37 can delete or duplicate the page data.

That is, the data of the output image (C) displayed on the display 3 when the page processing unit 37 stores the page data in the page data storage unit 300, is stored in the page data storage unit 300. Subsequently, when being read from the page data storage unit 300, the data indicating the output image (C) is read as media data indicating the background image (D). Then, the page processing unit 37 outputs the stroke arrangement data indicating the stroke image (B), among the page data read from the page data storage unit 300, to the stroke processing unit 32. Furthermore, the page processing unit 37 outputs the media data indicating the background image (D), among the page data read from the page data storage unit 300, to the background generating unit 34.

The display superimposing unit 36 superimposes the output image (C) from the image acquiring unit 31, the stroke image (B) from the stroke processing unit 32, the UI image (A) from the UI image generating unit 33, and the background image (D) from the background generating unit 34, in accordance with an instruction by the layout managing unit 35. Accordingly, for example, as illustrated in FIG. 6, the respective layers of the UI image (A), the stroke image (B), the output image (C), and the background image (D) are superimposed in an order in which the user can see the images (from the left side in FIG. 6) even if the images overlap each other.

Furthermore, the display superimposing unit 36 can switch between the image (C) and the image (D) illustrated in FIG. 6 to be exclusively overlapping the image (A) and the image (B). For example, in the case where the cable 10 between the electronic blackboard 2 and the video output device (the notebook PC 6, etc.) is pulled out while the image (A), the image (B), and the image (C) are initially displayed, the image (C) can be excluded from the superimposition targets, and the image (D) may be displayed, according to specifications by the layout managing unit 35.

In this case, the display superimposing unit 36 also performs processes of enlarging the display, reducing the display, and moving the display area.

The page data storage unit 300 stores page data, for example, as indicated below (Table 1).

TABLE 1

| PAGE DATA ID | START TIME | END TIME | STROKE ARRANGEMENT DATA ID | MEDIA DATA ID |
|---|---|---|---|---|
| p001 | 20130610102434 | 20130610102802 | st001 | m001 |
| p002 | 20130610102815 | 20130610103225 | st002 | m002 |
| p003 | 20130610103545 | 20130610104233 | st003 | m003 |
| . | . | . | . | . |
| . | . | . | . | . |

The page data indicated above (Table 1) is data for one page (stroke arrangement data (pieces of stroke data) and media data) displayed on the display 3. Note that there are many types of parameters included in the page data, and therefore, the contents of the page data will be described below in a plurality of separate tables.

As indicated in above (Table 1), the page data stores the following data in association with each other to identify any one page. The stored data includes, for example, a page data ID; a start time indicating the time when the display of the page has started; and an end time indicating the time when rewriting of the content of the page by strokes and gestures, etc., is no longer performed. Furthermore, the stored data includes a stroke arrangement data ID, etc., for identifying the stroke arrangement data generated by strokes drawn by the electronic pen 4 or the user's hand H. Furthermore, the stored data includes a media data ID, etc., for identifying the media data. Note that the stroke arrangement data is data for displaying the stroke image (B) illustrated in FIG. 6 on the display 3. Furthermore, the media data is data for displaying the background image (D) illustrated in FIG. 6 on the display 3.

For example, when the user draws the alphabetical letter "S" with the electronic pen 4, the letter is written by one stroke. In this case, one letter alphabetical letter [S] is indicated by one stroke data ID. However, when the user draws the alphabetical letter "T" with the electronic pen 4, the letter is written by two strokes. Therefore, one alphabetical letter "T" is indicated by two stroke data IDs.

Furthermore, the stroke arrangement data indicates detailed information as indicated below (Table 2).

TABLE 2

| | | | | | st001 | | |
|---|---|---|---|---|---|---|---|
| STROKE DATA ID | START TIME | END TIME | COLOR | WIDTH | COORDINATE ARRANGEMENT DATA ID | st002 | st003 |
| s001 | 20130610102502 | 20130610102505 | ff0000 | 2 | c001 | | |
| s002 | 20130610102612 | 20130610102615 | 000ff0 | 3 | c002 | | |
| s003 | 20130610102704 | 20130610102712 | 0 | 1 | c003 | | |
| . | . | . | . | . | . | | |
| . | . | . | . | . | . | | |
| . | . | . | . | . | . | | |

As indicated above (Table 2), one piece of stroke arrangement data is expressed by a plurality of pieces of stroke data. Note that the above (Table 2) indicates an example in which one line corresponds to one piece of stroke data. Also, one piece of stroke data includes, for example, a stroke data ID for identifying each piece of stroke data. Furthermore, one piece of stroke data includes a start time indicating the time of starting to write one stroke, and an end time indicating the time of finishing writing one stroke. Furthermore, one piece of stroke data indicates the color of the stroke, the width of the stroke, and a coordinate arrangement data ID for identifying the arrangement of the passing points of the stroke.

Furthermore, in the example indicated above (Table 2), the coordinate arrangement data identified by the "coordinate arrangement data ID" is, for example, data indicated in the following (Table 3).

TABLE 3

| X COORDINATE VALUE | Y COORDINATE VALUE | TIME DIFFERENCE | c001 PEN PRESSURE | c002 | c003 |
|---|---|---|---|---|---|
| 10 | 10 | 100 | 255 | | |
| 12 | 10 | 200 | 255 | | |
| 14 | 12 | 300 | 255 | | |
| . | . | . | . | | |
| . | . | . | . | | |
| . | . | . | . | | |

In the above (Table 3), the coordinate arrangement data indicates information including one point (the X coordinate value and the Y coordinate value) on the display 3, the time (milliseconds (ms)) of the difference from the start time of the stroke to the time of passing the point indicated by the coordinate values, and the pen pressure of the electronic pen 4 when the stroke is drawn. That is, an assembly of points indicated in (Table 3), is indicated by one piece of coordinate arrangement data indicated in (Table 2). For example, when the user draws the alphabetical letter "S" with the electronic pen 4, the letter is written by a single stroke, but the stroke passes through a plurality of passing points before finishing drawing the letter "S". Therefore the coordinate array data indicates data of the plurality of passing points.

Furthermore, the media data in the page data indicated above (Table 1) indicates detailed information as indicated below (Table 4).

TABLE 4

| MEDIA DATA ID | DATA TYPE | RECORDING TIME | X COORDINATE VALUE | Y COORDINATE VALUE | WIDTH | HEIGHT | FILE NAME |
|---|---|---|---|---|---|---|---|
| m001 | IMAGE | 20130610103432 | 0 | 0 | 1920 | 1080 | abc.jpg |
| m002 | IMAGE | 20130610105402 | 277 | 156 | 1366 | 768 | bcd.jpg |
| m003 | IMAGE | 20130610105017 | 277 | 156 | 1366 | 768 | cde.jpg |
| . | . | . | . | . | . | . | . |
| . | . | . | . | . | . | . | . |

As indicated above (Table 4), in the media data, each piece of data is stored in association with a media data ID in the page data indicated above (Table 1). In the above example (Table 4), the data stored in association with a media data ID includes the data type of the media data, and the recording time when the page data has been stored in the page data storage unit 300 from the page processing unit 37. Furthermore, the data stored in association with a media data ID includes the position (the X coordinate value and the Y coordinate value), the size (width and height), and the file name, etc., of the image displayed on the display 3 according to the page data. Among this information, the position of the image displayed on the display 3 according to the page data, indicates the position at the upper left end of the image displayed according to the page data, assuming that the coordinates of the upper left end of the display 3 are (X coordinate value, Y coordinate value)=(0, 0).

Referring back to FIG. 3, the remote license management table 310 manages license data necessary for executing the remote sharing process. Note that the license data is, for example, the remote license management table 310, as indicated below (Table 5).

TABLE 5

| PRODUCT ID | LICENSE ID | EXPIRATION DATE |
|---|---|---|
| 1001 | 12345678abcdefgh | 2012/12/31 |
| 1001 | 4321dcba8765hgfe | — |
| . | . | . |
| . | . | . |
| . | . | . |

In the example of the remote license management table 310 indicated above (Table 5), the product ID of the electronic blackboard 2, the license ID used for authentication, and the expiration date of the license, are managed in association with each other.

(Functional Configuration Example of File Processing Unit 40)

In the following, an example of the functional configuration of the file processing unit 40 illustrated in FIG. 3 will be described.

Figure 4:
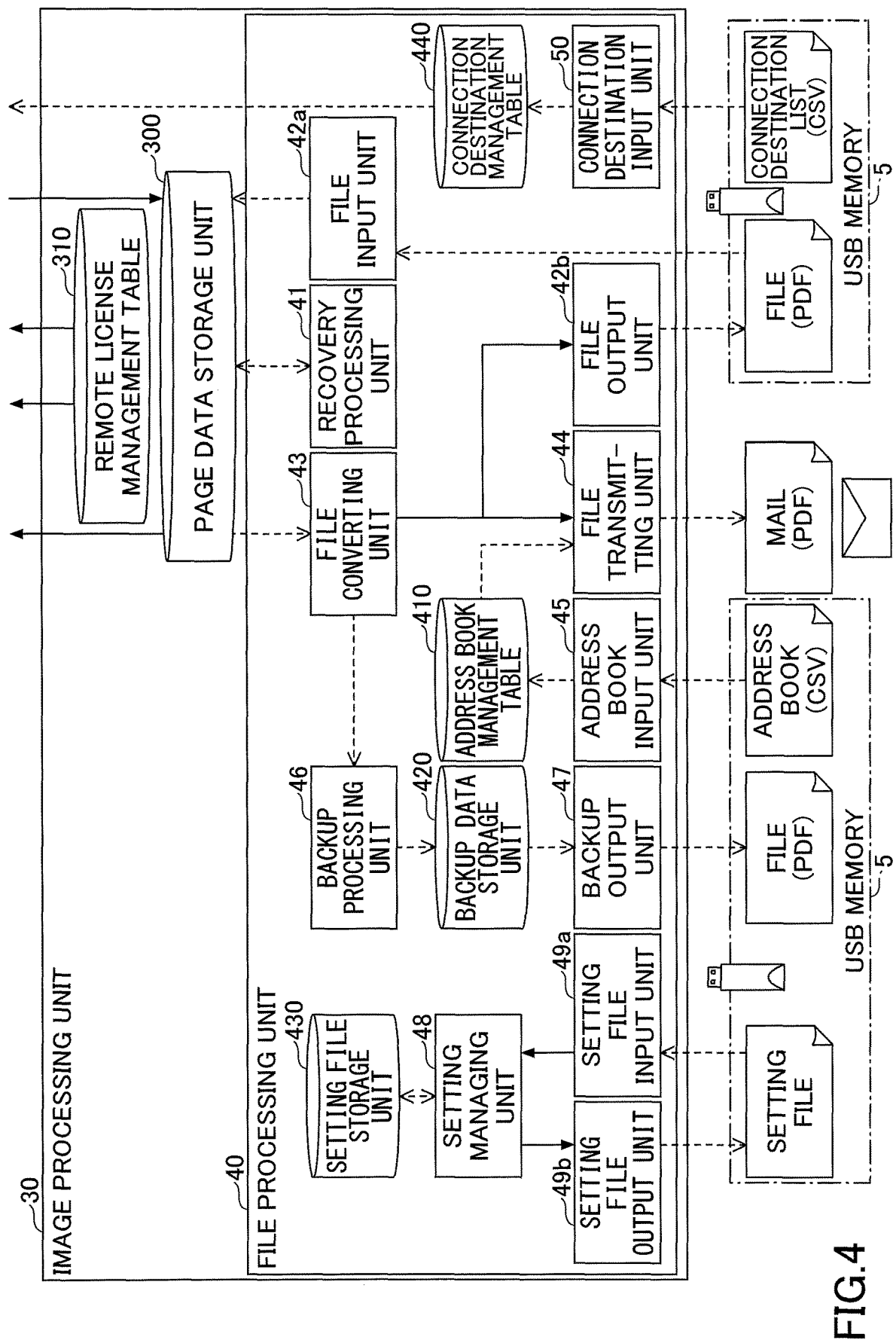
FIG. 4 is a functional block diagram of an example of a file processing unit according to an embodiment of the present invention.

FIG. 4 is a functional block diagram of an example of the file processing unit. For example, the file processing unit 40 includes a recovery processing unit 41, a file input unit 42a, a file output unit 42b, and a file converting unit 43. Further more, the file processing unit 40 includes a file transmitting unit 44, an address book input unit 45, a backup processing unit 46, a backup output unit 47, a setting managing unit 48, a setting file input unit 49a, a setting file output unit 49b, and a connection destination input unit 50. Furthermore, the file processing unit 40 includes an address book management table 410, a backup data storage unit 420, a setting file storage unit 430, and a connection destination management table 440.

The recovery processing unit 41 detects abnormal termination after the electronic blackboard 2 abnormally ends, and recovers unsaved page data. For example, in the case of normal termination, the page data is stored in the file format of PDF, etc., in the USB memory 5 via the file processing unit 40. However, in the case of abnormal termination such as when the power supply goes down, the page data remains to be stored in the page data storage unit 300. Therefore, when the power is turned on again, the recovery processing unit 41 restores the page data by reading the page data from the page data storage unit 300.

The file input unit 42a reads the PDF file, etc., from the USB memory 5, and stores each page as page data in the page data storage unit 300.

The file converting unit 43 converts the page data stored in the page data storage unit 300 into a PDF format file, etc.

The file output unit 42b records, in the USB memory 5, the PDF file output by the file converting unit 43.

The file transmitting unit 44 attaches the PDF file generated by the file converting unit 43, to an e-mail, and transmits the e-mail. For example, first, the display superimposing unit 36 (FIG. 3) displays the address book management table 410 on the display 3. Next, when the electronic blackboard accepts a transmission destination input by the user's operation by using an input device such as a touch panel, that is, a selection of a destination, the transmission destination is determined. Note that the address book management table 410 is, for example, data indicated in the following (Table 6).

TABLE 6

| NAME | MAIL ADDRESS |
|---|---|
| TARO | taro@alpha.cojp |
| HANAKO | hanako@beta.cojp |
| — | jiro@gamma.cojp |
| . | . |
| . | . |
| . | . |

As indicated above (Table 6), in the address book management table 410, the name of the destination and the e-mail address of the destination are managed in association with each other. Furthermore, the file transmitting unit 44 can accept input of a mail address as the destination, as the user operates an input device such as a touch panel.

The address book input unit 45 reads the list file of e-mail addresses from the USB memory 5 and manages the list file in the address book management table 410.

The backup processing unit 46 backs up a file output by the file output unit 42b and a file transmitted by the file transmitting unit 44, by storing these files in the backup data storage unit 420. If the user does not set the backup, the backup process is not performed. Note that the backup data is data as indicated below (Table 7).

TABLE 7

| iwb_20130610104423.pdf |
|---|
| iwb_20130625152245.pdf |
| iwb_20130628113418.pdf |
| . |
| . |

In the example indicated above (Table 7), each piece of data is stored in a PDF format, and each backup is performed.

The backup output unit 47 stores the backup files in the USB memory 5. When storing the files, a password is input for the purpose of security, by the user's operation of an input device such as a touch panel.

The setting managing unit 48 stores and reads setting data included in the electronic blackboard 2 in the setting file storage unit 430 to manage this data. Specifically, examples of setting data include a network setting, a date and time setting, a regional and language setting, a mail server setting, an address book setting, a connection destination list setting, and a setting related to backup. Note that the network setting is, for example, the setting of the IP address of the electronic blackboard 2, the setting of the net mask, the setting of the default gateway, and the setting of the Domain Name System (DNS), etc.

The setting file output unit 49b stores setting data related to the electronic blackboard 2 in the USB memory 5 as a setting file. Note that contents of the setting file cannot be viewed by the user due to security.

The setting file input unit 49a reads the setting file stored in the USB memory 5 and applies setting data to settings related to the electronic blackboard.

The connection destination input unit 50 reads a file of a connection destination list indicating connection destination IP addresses of the remote sharing process from the USB memory 5, and manages the file in the connection destination management table 440. An example of the connection destination management table 440 is indicated below (Table 8).

TABLE 8

| NAME | IP ADDRESS |
|---|---|
| CONFERENCE ROOM 1 | 192.0.0.1 |
| CONFERENCE ROOM 2 | 192.0.0.2 |
| — | 192.0.0.3 |
| . | . |
| . | . |
| . | . |

By using the connection destination list indicated above (Table 8), when the electronic blackboard 2 is the participating device, the user of the participating device is saved of the trouble of inputting the IP address of the electronic blackboard serving as the hosting device. Therefore, the connection destination list is managed by the connection destination management table 440, etc. Furthermore, in the connection destination management table 440, the name of the site where the electronic blackboard 2 that is the hosting device that can participate is installed, and the IP address of the hosting device, are managed in association with each other.

Note that the connection destination management table 440 need not be included. However, in this case, the user of the participating device needs to input the IP address of the hosting device, by using an input device such as a touch panel, in order to start the remote requesting process with the hosting device. Therefore, the user of the participating device acquires the IP address of the hosting device from the user of the hosting device, by telephone or by e-mail, etc.

(Functional Configuration Example of Communication Control Unit 60)

In the following, an example of a functional configuration of the communication control unit 60 illustrated in FIG. 3 will be described.

Figure 5:
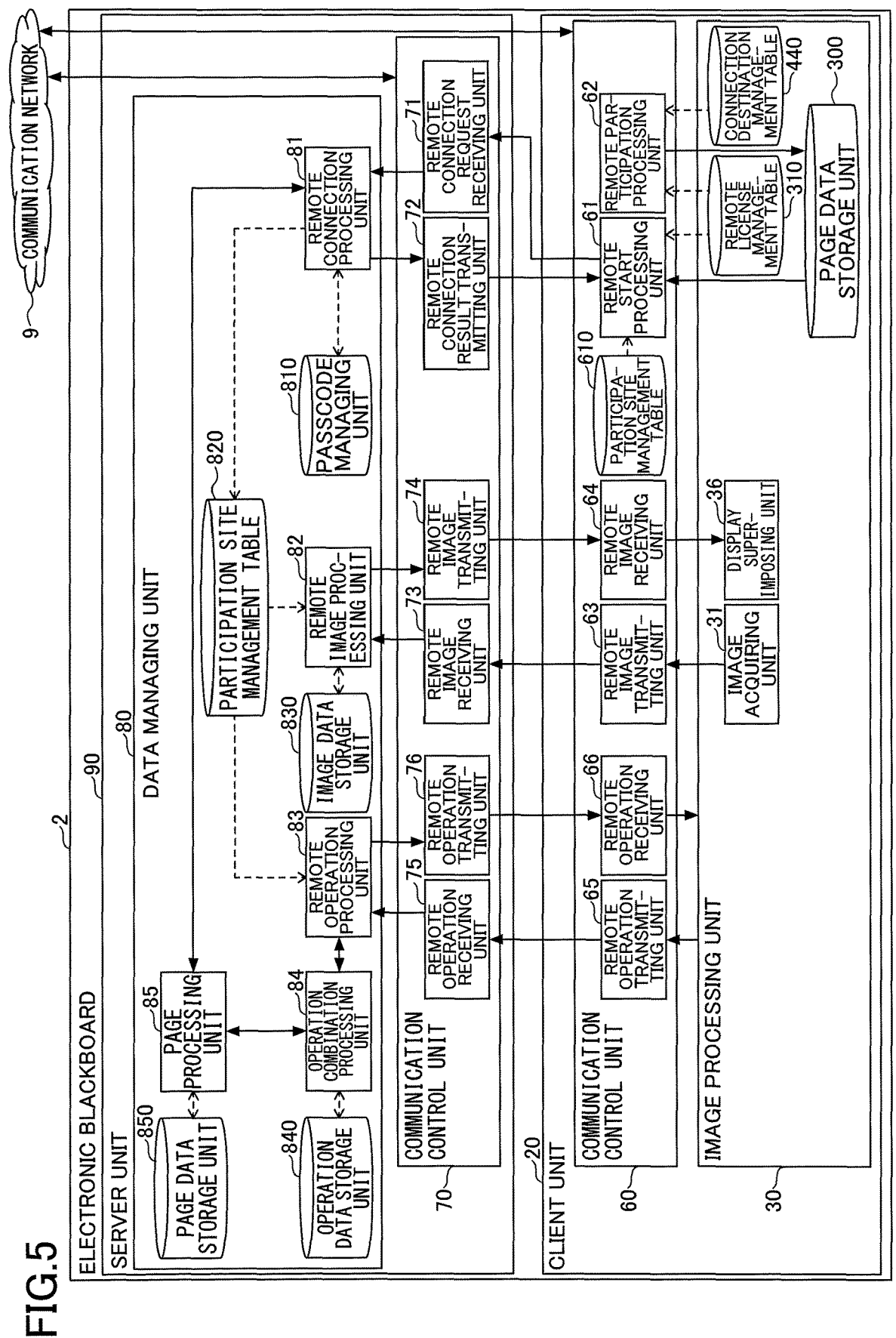
FIG. 5 is a functional block diagram of an example of a server unit and a transmission control unit according to an embodiment of the present invention.

FIG. 5 is a functional block diagram of an example of the server unit and the transmission control unit. For example, the communication control unit 60 implements control of communication with another one of the electronic blackboards 2 via the communication network 9, or communication with a communication control unit 70 in the server unit 90.

Therefore, the communication control unit 60 includes a remote start processing unit 61, a remote participation processing unit 62, a remote image transmitting unit 63, a remote image receiving unit 64, a remote operation transmitting unit 65, a remote operation receiving unit 66, and a participation site management table 610.

The remote start processing unit 61 sends, to the server unit 90 of the same electronic blackboard 2, a request to newly start a remote sharing process, and receives a result of the request from the server unit 90. In this case, the remote start processing unit 61 refers to the remote license management table 310. Specifically, if license information (product ID, license ID, and expiration date, etc.) is managed, the remote start processing unit 61 is able to refer to the license information and make a request to start a remote sharing process. However, when the license information is not managed, the remote start processing unit 61 is unable to make a request to start a remote sharing process.

The participation site management table 610 is a table for managing electronic blackboards that are participating devices presently participating in the remote sharing process, when the electronic blackboard is the hosting device. For example, the participation site management table 610 is data indicated below (Table 9).

TABLE 9

| NAME | IP ADDRESS |
|---|---|
| CONFERENCE ROOM 1 | 192.0.0.1 |
| CONFERENCE ROOM 2 | 192.0.0.2 |
| — | 192.0.0.8 |
| . | . |
| . | . |
| . | . |

As indicated above (Table 9), in the participation site management table 610, the name of the site where the participating electronic blackboard 2 is installed and the IP address of the participating electronic blackboard 2 are managed in association with each other.

The remote participation processing unit 62 sends, via the communication network 9, a participation request to participate in the remote sharing process, to a remote connection request receiving unit 71 in the server unit 90 included in the hosting device which has already started the remote sharing process. Note that when making a participation request, the remote participation processing unit 62 refers to the remote license management table 310. Furthermore, when the remote participation processing unit 62 participates in a remote sharing process that has already started, the remote participation processing unit 62 refers to the connection destination management table 440 and acquires the IP address of the electronic blackboard 2 of the participation destination. Note that the remote participation processing unit 62 may not refer to the connection destination management table, and numbers of the IP address of the electronic blackboard 2 of the participation destination may be input by the user's operation of an input device such as a touch panel.

The remote image transmitting unit 63 transmits the output image (C) sent from the video acquiring unit 21 (FIG. 3) via the image acquiring unit 31, to the server unit 90.

The remote image receiving unit 64 receives, from the server unit 90, the image data, which is transmitted from a video output device connected to another electronic blackboard 2, and outputs the image data to the display superimposing unit 36. Accordingly, the electronic blackboard 2 implements a remote sharing process.

The remote operation transmitting unit 65 transmits operation data necessary for a remote sharing process, to the server unit 90. Examples of operation data include addition of a stroke, deleting a stroke, editing (enlargement, reduction, and movement) of a stroke, storage of page data, creation of page data, duplication of page data, deleting page data, and data related to switching the displayed page, etc.

The remote operation receiving unit 66 receives the operation data input at another electronic blackboard 2, from the server unit 90, and outputs the operation data to the image processing unit 30, thereby implementing a remote sharing process.

Furthermore, as illustrated in FIG. 3, the client unit 20 includes a determining unit 20A1 and a modifying unit 20A2.

The determining unit 20A1 determines whether a storage area, that is, a so-called saving destination (hereinafter referred to as "storage destination") for storing image data, etc., generated by the image processing unit 30, is an external device such as the USB memory 5.

When the determining unit 20A1 determines that the storage destination is an external device, the modifying unit 20A2 modifies the image data to be stored so that the modified image data is stored in the storage destination.

Note that the determining unit 20A1 and the modifying unit 20A2 are implemented by, for example, the CPU 101 (FIG. 2), etc. Furthermore, details of the processing by the determining unit 20A1 and the modifying unit 20A2 will be described later.

[Functional Configuration Example of Server Unit 90]

In the following, the functional configuration of the server unit 90 will be described.

The server unit 90 is provided in each electronic blackboard 2. That is, any of the electronic blackboards 2 can serve as a server. Therefore, the server unit 90 includes the communication control unit 70 and a data managing unit 80.

(Functional Configuration Example of Communication Control Unit 70)

In the following, an example of the functional configuration of the communication control unit 70 will be described.

The communication control unit 70 controls communication between the communication control unit 70 in the client unit 20 in the same electronic blackboard 2, and the communication control unit 70 in the client unit 20 in the other electronic blackboard 2 via the communication network 9. The data managing unit 80 manages operation data and image data, etc.

The communication control unit 70 includes the remote connection request receiving unit 71, a remote connection result transmitting unit 72, a remote image receiving unit 73, a remote image transmitting unit 74, a remote operation receiving unit 75, and a remote operation transmitting unit 76.

The remote connection request receiving unit 71 receives a start request for starting a remote sharing process from the remote start processing unit 61, and receives a participation request for participating in the remote sharing process from the remote participation processing unit 62.

The remote connection result transmitting unit 72 transmits the result of the start request of the remote sharing process to the remote start processing unit 61, and transmits the result of the participation request for the remote sharing process to the remote participation processing unit 62.

The remote image receiving unit 73 receives the image data (data of the output image (C) illustrated in FIG. 6, etc.)

from the remote image transmitting unit 63, and transmits the image data to a remote image processing unit 82.

The remote image transmitting unit 74 receives the image data from the remote image processing unit 82 and transmits the image data (data of the output image (C) illustrated in FIG. 6, etc.) to the remote image receiving unit 64.

The remote operation receiving unit 75 receives operation data (data such as a stroke image (B) illustrated in FIG. 6, etc.) from the remote operation transmitting unit 65, and transmits the operation data to a remote operation processing unit 83.

The remote operation transmitting unit 76 receives the operation data from the remote operation processing unit 83 and transmits the operation data (data such as a stroke image (B) illustrated in FIG. 6, etc.) to the remote operation receiving unit 66.

(Functional Configuration Example of Data Managing Unit 80)

In the following, an example of the functional configuration of the data managing unit 80 will be described.

The data managing unit 80 includes a remote connection processing unit 81, the remote image processing unit 82, the remote operation processing unit 83, an operation combination processing unit 84, and a page processing unit 85. Furthermore, the data managing unit 80 includes a passcode managing unit 810, a participation site management table 820, an image data storage unit 830, an operation data storage unit 840, and a page data storage unit 850.

The remote connection processing unit 81 starts a remote sharing process and ends a remote sharing process. Furthermore, based on license information received by the remote connection request receiving unit 71, the remote connection processing unit 81 confirms whether there is a license and whether the present time is within the license period. Note that the license information is received together with a remote sharing process start request from the remote start processing unit 61, or the license information is received together with a participation request for participating in a remote sharing process from the remote participation processing unit 62. Furthermore, the remote connection processing unit 81 confirms whether the participation requests from the other electronic blackboards 2 as the client units 20, exceed a predetermined number of participants that can participate.

Furthermore, the remote connection processing unit 81 determines whether a passcode, which is sent when a participation request for participating in a remote sharing process is made from another electronic blackboard 2, is the same as the passcode managed by the passcode managing unit 810, and if the passcodes are the same, the remote connection processing unit 81 allows the participation in the remote sharing process. Note that the passcode is issued by the remote connection processing unit 81 when a new remote sharing process is started. Then, the user of the electronic blackboard 2, which is a participating device attempting to participate in the remote sharing process, is notified of the passcode by telephone or electronic mail, etc., from the user of the electronic blackboard 2 serving as the hosting device. Accordingly, the user of the participating device who is attempting to participate in the remote sharing process, will be allowed to participate, by inputting the passcode to the participating device with an input device such as a touch panel to make a participation request. Note that when the usability of the user is to be prioritized over security, confirmation of the passcode may be omitted.

Furthermore, when the electronic blackboard 2 is the hosting device, the remote connection processing unit 81 stores, in the participation site management table 820 in the server unit 90, the participation site information included in the participation request sent from the remote participation processing unit 62 of the participating device via the communication network 9. Then, the remote connection processing unit 81 reads the remote site information stored in the participation site management table 820, and transmits the remote site information to the remote connection result transmitting unit 72.

The remote connection result transmitting unit 72 transmits the remote site information to the remote start processing unit 61 in the client unit 20 of the same hosting device. The remote start processing unit 61 stores the remote site information in the participation site management table 610. Accordingly, in the hosting device, both the client unit 20 and the server unit 90 manage the remote site information.

The remote image processing unit 82 receives image data (output image (C) illustrated in FIG. 6) from a video output device (the notebook PC 6, etc.) connected to the client unit of each electronic blackboard 2 participating in the remote sharing process (including the client unit 20 of the own electronic blackboard which is the hosting device), and stores the image data in the image data storage unit 830. Furthermore, the electronic blackboard 2 serving as the host device stores the received image data in the image data storage unit 830. Furthermore, the electronic blackboard 2 serving as the host device determines the order of displaying the image data to be subjected to the remote sharing process, according to the order of the time of arriving at the server unit 90 of the own electronic blackboard 2 that is the hosting device.

The remote image processing unit 82 refers to the participation site management table 820. Then, the remote image processing unit 82 transmits the image data in the determined order as described above, to the client units 20 of all the electronic blackboards 2 participating in the remote sharing process (including the client unit of the own electronic blackboard serving as the hosting device), via the communication control unit 70 (the remote image transmitting unit 74).

The remote operation processing unit 83 receives various kinds of operation data such as a stroke image (stroke image (B) etc., illustrated in FIG. 6), etc., drawn at the client unit of each electronic blackboard 2 participating in the remote sharing process (including the client unit of the own electronic blackboard that is the hosting device). Then, the remote operation processing unit 83 determines the display order of the images to be subjected to the remote sharing process, in the order of the time of arriving at the server unit 90 of the own electronic blackboard 2 serving as the hosting device. Note that the various kinds of operation data are the same as the various kinds of operation data described above. Furthermore, the remote operation processing unit 83 refers to the participation site management table 820 and transmits the operation data to the client units 20 of all of the electronic blackboards 2 participating in the remote sharing process (including the client unit of the own electronic blackboard serving as the hosting device).

The operation combination processing unit 84 combines the pieces of operation data of the respective electronic blackboards 2 output from the remote operation processing unit 83, and stores operation data obtained as the result of this combination in the operation data storage unit 840. Furthermore, the operation combination processing unit 84 sends the operation data obtained as the result of the combination, to the remote operation processing unit 83. This operation data is transmitted from the remote operation transmitting unit 76 to the client unit of the electronic blackboard that is the hosting device and the client units of the respective electronic blackboards that are the participating devices. Thus, an image related to the same operation data is displayed on each of the electronic blackboards 2. Note that an example of the operation data is data as indicated below (Table 10).

TABLE 10

| SEQ | OPERATION NAME | TRANSMISSION SOURCE IP ADDRESS: Port No. | TRANSMISSION DESTINATION IP ADDRESS: Port No. | OPERATION TYPE | OPERATION TARGET (PAGE DATA ID/STROKE DATA ID) | DATA |
|---|---|---|---|---|---|---|
| 1 | ADD | 192.0.0.1:50001 | 192.0.0.1:50000 | STROKE | p005 | . . . (STROKE DATA) |
| 2 | ADD | 192.0.0.1:50000 | 192.0.0.2:50001 | STROKE | p005 | . . . (STROKE DATA) |
| 3 | UPDATE | 192.0.0.2:50001 | 192.0.0.1:50000 | STROKE | s006 | (50, 40) |
| 4 | UPDATE | 192.0.0.1:50000 | 192.0.0.1:50001 | STROKE | s006 | (50, 40) |
| 5 | DELETE | 192.0.0.2:50001 | 192.0.0.1:50000 | STROKE | s007 | — |
| 6 | DELETE | 192.0.0.1:50000 | 192.0.0.1:50001 | STROKE | s007 | — |
| 7 | ADD | 192.0.0.1:50001 | 192.0.0.1:50000 | PAGE | — | — |
| 8 | ADD | 192.0.0.1:50000 | 192.0.0.2:50001 | PAGE | — | — |
| 9 | ADD | 192.0.0.2:50001 | 192.0.0.1:50000 | IMAGE | p006 | aaa.jpg |
| 10 | ADD | 192.0.0.1:50000 | 192.0.0.1:50001 | IMAGE | p006 | aaa.jpg |
| . | . | . | . | . | . | . |
| . | . | . | . | . | . | . |
| . | . | . | . | . | . | . |

As indicated above (Table 10), the operation data indicates Sequence (SEQ), the operation name of the data, and the IP address of the electronic blackboard 2 that is the transmission source of the operation data. Furthermore, the operation data indicates the Port No. of the client unit (the server unit), the IP address of the electronic blackboard 2 that is the transmission destination of the operation data, the Port No. of the client unit (the server unit), and the operation type of the operation data. Furthermore, the operation data indicates the operation target of the operation data and data indicating the content of the operation data. Note that as indicated above (Table 10), the items of the operation data are managed in association with each other. For example, "SEQ1" indicates that a stroke has been drawn at the client unit (Port No.: 50001) of the electronic blackboard (IP address: 192.0.0.1) serving as the hosting device. In this case, in the above (Table 10), operation data has been transmitted to the server unit (Port No.: 50000) of the electronic blackboard 2 (IP address: 192.0.0.1) that is the same hosting device. Note that in this case, the operation type is "STROKE", the operation target is the page data ID "p005", and the data indicating the content of the operation data is data indicating a stroke. Furthermore, "SEQ2" indicates that from the server unit (Port No.:50000) of the electronic blackboard (IP address: 192.0.0.1) serving as the hosting device, operation data has been transmitted to the client unit (Port No.: 50001) of another electronic blackboard (IP address: 192.0.0.1) that is a participating device.

Note that the operation combination processing unit 84 performs the combination in the order in which the operation data is input to the operation combination processing unit 84. Therefore, if the communication network 9 is not congested, the stroke image (B) is displayed on the display 3 of all of the electronic blackboards 2 participating in the remote sharing process, in the order of strokes drawn by the users of the respective electronic blackboards 2.

The page processing unit 85 has a function similar to that of the page processing unit 37 in the image processing unit 30 of the client unit 20. Also, in the server unit 90, the page data indicated in Tables 1 to 3 is stored in the page data storage unit 850. Note that the page data storage unit 850 has the same contents as the page data storage unit 300 in the image processing unit 30, and therefore descriptions thereof are omitted.

<Process Examples or Operation Examples>

Figure 7:
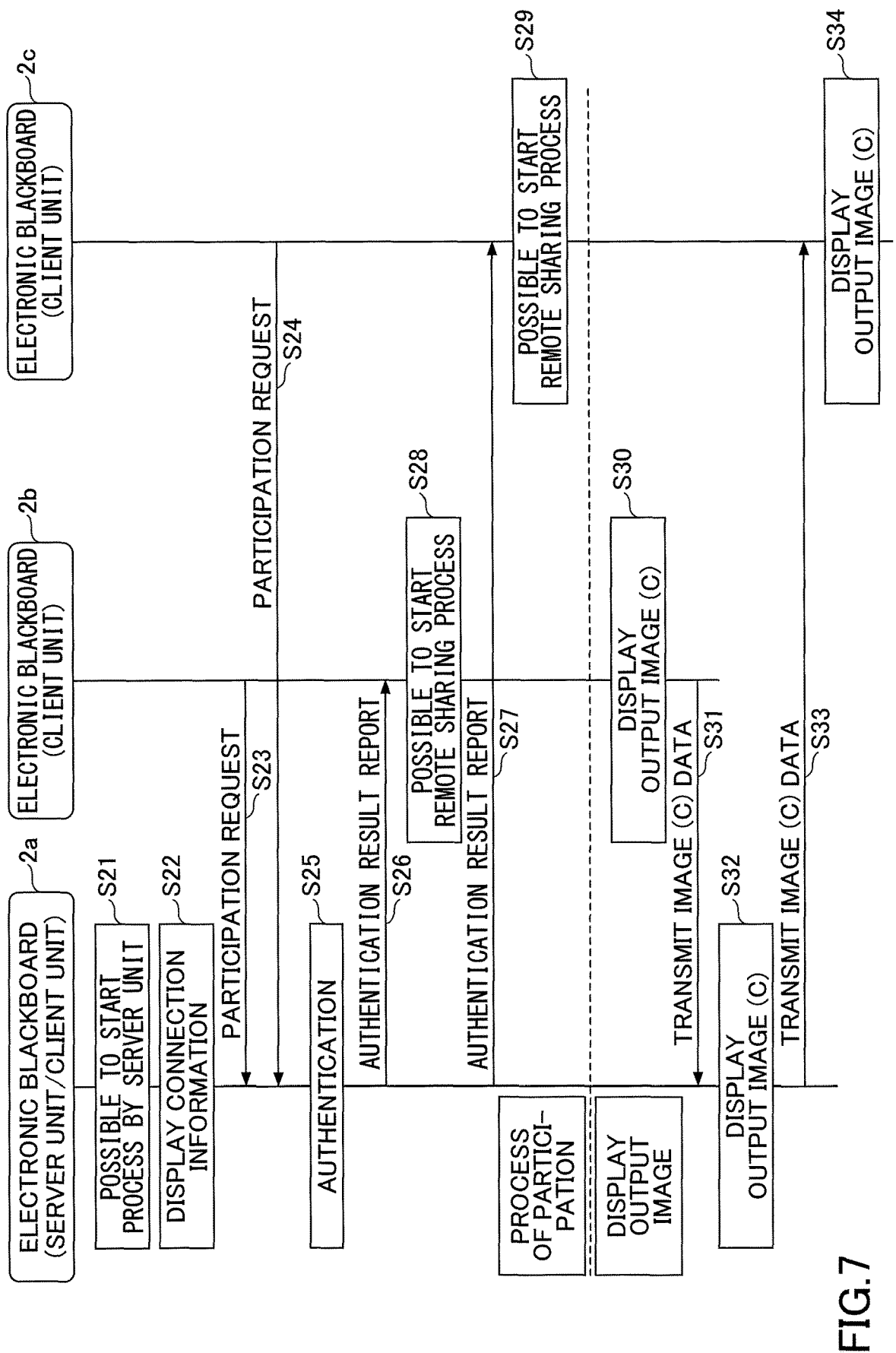
FIG. 7 is a sequence diagram (part 1) illustrating an example of processes of each electronic blackboard according to an embodiment of the present invention.
Figure 8:
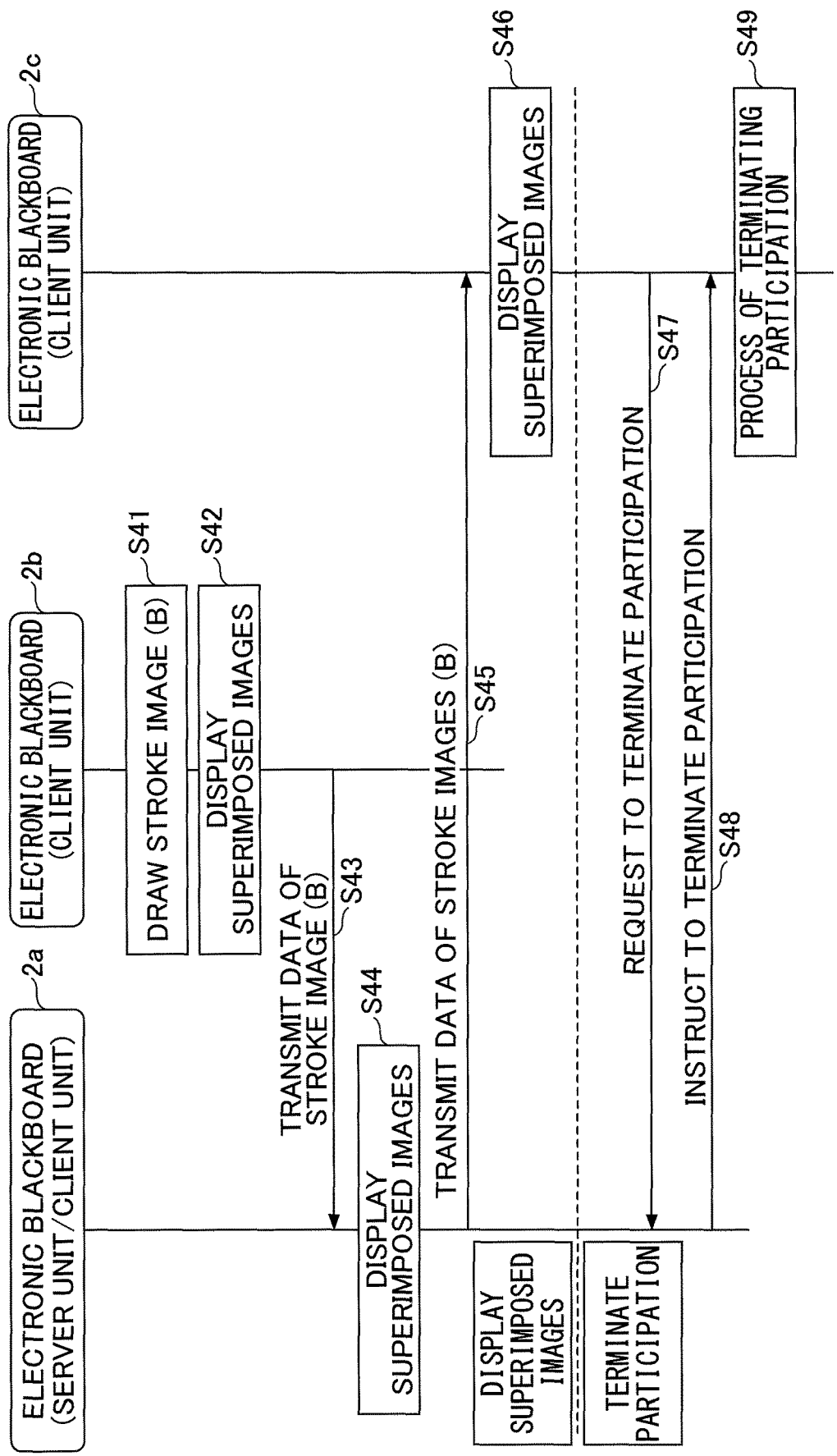
FIG. 8 is a sequence diagram (part 2) illustrating an example of processes of each electronic blackboard according to an embodiment of the present invention.

In the following, process examples or operation examples according to the present embodiment will be described. FIGS. 7 and 8 are sequence diagrams illustrating examples of processes of each electronic blackboard.

In the examples illustrated in FIGS. 7 and 8, a description is given of a case where the electronic blackboard 2a serves as a hosting device (server unit and client unit) hosting a remote sharing process. On the other hand, in the examples illustrated in FIGS. 7 and 8, the electronic blackboards 2b and 2c serve as a participating device (client unit) participating in the remote sharing process. Furthermore, the displays 3a, 3b, and 3c are connected to the electronic blackboards 2a, 2b, and 2c, respectively. Furthermore, the notebook PCs 6a, 6b, and 6c are also connected to the electronic blackboards 2a, 2b, and 2c, respectively. Furthermore, the electronic pens 4a, 4b, and 4c are used at the electronic blackboards 2a, 2b, and 2c, respectively.

(Participation Process Example)

In the following, an example of a process for the electronic blackboards 2b and 2c to participate in the remote sharing process will be described.

When the power switch of the electronic blackboard 2a is turned by the user's operation, the client unit 20 of the electronic blackboard 2a is activated. Then, the user inputs an operation to activate the server unit 90 with an input device such as a touch panel. Accordingly, the remote start processing unit 61 of the client unit 20 outputs an instruction to start a process by the server unit 90, to the remote connection request receiving unit 71 of the server unit 90 of the same electronic blackboard 2a. Accordingly, in the electronic blackboard 2a, not only the client unit 20 but also the server unit 90 can start various processes (step S21).

Next, the UI image generating unit 33 in the client unit 20 of the electronic blackboard 2a generates connection information, which is used for establishing a connection with the electronic blackboard 2a. Then, the video superimposing unit 28 displays the connection information, which has been obtained from the UI image generating unit 33 via the display superimposing unit 36, on the display 3a (step S22). This connection information includes the IP address of the hosting device and a passcode generated for the present remote sharing process. In this case, the passcode stored in the passcode managing unit 810 is read by the remote connection processing unit 81 illustrated in FIG. 5. Furthermore, the passcode is sequentially transmitted to the remote connection result transmitting unit 72 and the remote start processing unit 61. Furthermore, the passcode is transmitted from the communication control unit 60 including the remote start processing unit 61, to the image processing unit 30 illustrated in FIG. 5, and is finally input to the UI image generating unit 33. Thus, the connection information will include a passcode. Then, the connection information is transmitted to the users of the electronic blackboards 2b and 2c by the user of the electronic blackboard 2a by telephone or electronic mail. Note that when there is the connection destination management table 440, even if the connection information does not include the IP address of the hosting device, the participating device can make a participation request.

Next, in the electronic blackboards 2b and 2c, when the input of the connection information is accepted, according to each user's operation of an input device such as the touch panel, the remote participation processing unit 62 in the client unit 20 of each electronic blackboard 2b and 2c makes a participation request by transmitting the passcode, to the communication control unit 70 in the server unit 90 of the electronic blackboard 2a via the communication network 9, based on the IP address in the connection information (steps S23 and S24). Accordingly, the remote connection request receiving unit 71 of the communication control unit 70 receives the participation request (including the passcode), from each of the electronic blackboards 2b and 2c, and outputs the passcode to the remote connection processing unit 81.

Next, the remote connection processing unit 81 authenticates the passcode received from each electronic blackboard 2b and 2c by using the passcode managed by the passcode managing unit 810 (step S25). Then, the remote connection result transmitting unit 72 sends a report indicating the authentication result to the client unit 20 of each electronic blackboard 2b and 2c (steps S26 and S27). When it is determined that each of the electronic blackboards 2b and 2c is a legitimate electronic blackboard by the authentication in step S25, communication of a remote sharing process is established between the electronic blackboard 2a serving as the hosting device and the electronic blackboards 2b and 2c serving as the participating devices. Accordingly, the remote participation processing unit 62 in the client unit 20 of each electronic blackboard 2b and 2c enables the start of the remote sharing process with the other electronic blackboards (steps S28 and S29).

(Display Example of Output Image)

In the following, an example of a process of displaying the output image (C) (FIG. 6) in the remote sharing process will be described.

First, the electronic blackboard 2b displays the output image (C) on the display 3b (FIG. 1) (step S30). Specifically, the image acquiring unit 31 of the electronic blackboard 2b receives data of the output image (C) displayed on the notebook PC 6b, from the notebook PC 6b (FIG. 1) via the video acquiring unit 21 (FIG. 3). Next, the received data is transmitted to the display 3b via the display superimposing unit 36 and the video superimposing unit 28, and then the display 3b displays the output image (C).

Next, the image processing unit 30 (FIG. 3) including the image acquiring unit 31 (FIG. 3) of the electronic blackboard 2b transmits the data of the output image (C) to the remote image transmitting unit 63 (FIG. 5). Next, the communication control unit 60 (FIG. 5) including the remote image transmitting unit 63 transmits the data of the output image (C) to the communication control unit 70 (FIG. 5) of the electronic blackboard 2a serving as the hosting device, via the communication network 9 (FIG. 5) (step S31). Accordingly, the remote image receiving unit 73 (FIG. 5) of the electronic blackboard 2a receives the data of the output image (C). Furthermore, the remote image receiving unit 73 outputs the data to the remote image processing unit (FIG. 5), so that the remote image processing unit 82 stores the data of the output image (C) in the image data storage unit 830 (FIG. 5).

Next, the electronic blackboard 2a serving as the hosting device displays the output image (C) on the display 3a (FIG. 1) (step S32). Specifically, the remote image processing unit 82 of the electronic blackboard 2a outputs the data of the output image (C) received from the remote image receiving unit 73, to the remote image transmitting unit 74. Subsequently, the remote image transmitting unit 74 outputs the data of the output image (C) to the remote image receiving unit 64 in the client unit 20 of the electronic blackboard 2a, which is the same hosting device. Then, the remote image receiving unit 64 outputs the data of the output image (C) to the display superimposing unit 36 (FIG. 3). Furthermore, the display superimposing unit 36 outputs the data of the output image (C) to the video superimposing unit 28 (FIG. 3). Next, the video superimposing unit 28 outputs the data of the output image (C) to the display 3a. Accordingly, the display 3a displays the output image (C).

Next, the communication control unit 70 including the remote image transmitting unit 74 in the server unit 90 (FIG. 3) of the electronic blackboard 2a serving as the hosting device, transmits, via the communication network 9, the data of the output image (C) (step S33). Note that the transmission destination is the communication control unit 60 of the electronic blackboard 2c other than the electronic blackboard 2b that is the transmission source of the data of the output image (C). Accordingly, the remote image receiving unit 64 of the electronic blackboard 2c, which is the participating device, receives the data of the output image (C).

Next, the electronic blackboard 2c displays the output image (C) on the display 3c (step S34). Specifically, the remote image receiving unit 64 of the electronic blackboard 2c outputs the data of the output image (C) received in the step S33, to the display superimposing unit 36 of the electronic blackboard 2c. The display superimposing unit 36 outputs the data of the output image (C) to the video superimposing unit 28. The video superimposing unit 28 outputs the data of the output image (C) to the display 3c. Accordingly, the display 3c displays the output image (C).

Note that when the data of the UI image (A) and the data of the stroke image (B) illustrated in FIG. 6, as well as the data of the output image (C), are input, the display superimposing unit 36 generates superimposed images (A, B, C). Then, the video superimposing unit 28 outputs data of the superimposed images (A, B, C) to the display 3c. Also, when the data of a video (E) for the TV conference has been sent from the TV (video) conference terminal 7 to the video superimposing unit 28, the video superimposing unit 28 superimposes the data of the video (E) for the TV conference on the superimposed images (A, B, C) by a picture-in-picture operation, and outputs the superimposed images to the display 3c. Note that the video (E) for the TV conference is an output video received from another terminal via the TV (video) conference terminal 7 illustrated in FIG. 3 or the communication network 9 (FIG. 3).

(Display Example of Superimposed Images)

In the following, with reference to FIG. 8, an example of a process of displaying superimposed images in the remote sharing process will be described.

First, at the electronic blackboard 2b, the user draws a stroke image (B) (FIG. 6) indicating a stroke by using the electronic pen 4b (step S41).

Next, as illustrated in FIG. 6, the display superimposing unit 36 (FIG. 3) of the electronic blackboard 2b superimposes the stroke image (B) on the UI image (A) and the output image (C). The video superimposing unit 28 displays the superimposed images (A, B, C) on the display 3b (FIG. 1) of the electronic blackboard 2b (step S42). Specifically, the stroke processing unit 32 (FIG. 3) of the electronic blackboard 2b receives data of the stroke image (B) as operation data, from the coordinate detecting unit 22 (FIG. 3) and the contact detecting unit 24 (FIG. 3) via the event assigning unit 25 (FIG. 3), and transmits the data to the display superimposing unit 36. Accordingly, the display superimposing unit 36 can superimpose the stroke image (B) on the UI image (A) and the output image (C), and the video superimposing unit 28 can display the superimposed images (A, B, C) on the display 3b of the electronic blackboard 2b.

Next, the image processing unit 30 including the stroke processing unit 32 (FIG. 3) of the electronic blackboard 2b transmits the data of the stroke image (B) to the remote operation transmitting unit 65 (FIG. 5). Furthermore, the remote operation transmitting unit 65 of the electronic blackboard 2b transmits the data of the stroke image (B) to the communication control unit 70 (FIG. 5) of the electronic blackboard 2a serving as the hosting device, via the communication network 9 (FIG. 1) (step S43). Accordingly, the remote operation receiving unit 75 (FIG. 5) of the electronic blackboard 2a receives the data of the stroke image (B). Next, the remote operation receiving unit 75 outputs the received data to the remote operation processing unit 83, so that the remote operation processing unit 83 outputs the data of the stroke image (B) to the operation combination processing unit 84. In this manner, the data of the stroke image (B) drawn at the electronic blackboard 2b is sequentially transmitted to the remote operation processing unit 83 of the electronic blackboard 2a, which is the hosting device, each time drawing is performed. The data of this stroke image (B) is data indicated by each stroke data ID indicated above (Table 2). Therefore, for example, when the user draws the alphabetical letter "T" with the electronic pen 4, the letter is written by two strokes, so that the pieces of data of the stroke image (B) indicated by two stroke data IDs are sequentially transmitted.

Next, the electronic blackboard 2a serving as the hosting device displays the superimposed images (A, B, C) including the data of the stroke image (B) sent from the electronic blackboard 2b, on the display 3a (step S44). Specifically, the operation combination processing unit 84 of the electronic blackboard 2a combines the pieces of data of the plurality of stroke images (B) sequentially sent via the remote operation processing unit 83, and stores the combined data in the operation data storage unit 840 and returns the combined data to the remote operation processing unit 83. Accordingly, the remote operation processing unit 83 outputs, to the remote operation transmitting unit 76, the data of the stroke images (B) after the combination, which is received from the operation combination processing unit 84. The remote operation transmitting unit 76 outputs the data of the stroke images (B) after the combination to the remote operation receiving unit 66 of the client unit 20 of the electronic blackboard 2a that is the same hosting device. The remote operation receiving unit 66 outputs the data of the stroke images (B) after the combination to the display superimposing unit 36 in the image processing unit 30. Therefore, the display superimposing unit 36 superimposes the stroke images (B) after the combination on the UI image (A) and the output image (C). Finally, the video superimposing unit 28 displays the superimposed images (A, B, C) superimposed by the display superimposing unit 36, on the display 3a.

Next, the communication control unit 70 including the remote operation transmitting unit 76 in the server unit 90 of the electronic blackboard 2a serving as the hosting device, transmits the data of the stroke images (B) after the combination, via the communication network 9 (step S45). Note that the transmission destination is the communication control unit 60 of the electronic blackboard 2c other than the electronic blackboard 2b that is the transmission source of the data of the stroke images (B). Accordingly, the remote operation receiving unit 66 of the electronic blackboard 2c, which is the participating device, receives the data of the stroke images (B) after the combination.

Next, the electronic blackboard 2c displays the superimposed images (A, B, C) on the display 3c (step S46). Specifically, the remote operation receiving unit 66 of the electronic blackboard 2c outputs the data of the stroke images (B) after the combination received in the step S45, to the image processing unit 30 of the electronic blackboard 2c. Next, the display superimposing unit 36 of the image processing unit 30 superimposes the data of the UI image (A) and the data of the output image (C), with the data of the stroke images (B) after the combination, and outputs the data of the superimposed images (A, B, C) to the video superimposing unit 28. Then, the video superimposing unit 28 outputs the data of the superimposed images (A, B, C) to the display 3c. Accordingly, the display 3c displays the superimposed images (A, B, C).

Note that in the above process, the output image (C) is displayed on the display 3; however, the background image (D) may be displayed instead of this output image (C). Alternatively, the exclusive relationship between the output image (C) and the background image (D) may be canceled, and both the output image (C) and the background image (D) may be simultaneously displayed on the display 3.

(Example of Participation Termination)

Next, an example of a process in which the participating apparatus terminates the participation in the remote sharing process will be described. In the illustrated example, a process in which the electronic blackboard 2c terminates the participation, is illustrated.

First, the electronic blackboard 2c accepts a request to terminate the participation made by operating an input device such as the touch panel by the user. Next, the remote participation processing unit 62 (FIG. 5) sends the request to terminate the participation to the communication control unit 70 (FIG. 5) in the server unit 90 (FIG. 5) of the electronic blackboard 2a serving as the hosting device (step S47). Accordingly, the remote connection request receiving unit 71 (FIG. 5) of the communication control unit 70 receives the participation termination request from the electronic blackboard 2c. Then, the remote connection request receiving unit 71 outputs the participation termination request together with the IP address of the electronic blackboard 2c, to the remote connection processing unit 81 (FIG. 5). Then, based on the IP address sent from the remote connection request receiving unit 71, the remote connection processing unit 81 of the electronic blackboard 2a edits the participation site management table 820 (FIG. 5). Specifically, the remote connection processing unit 81 deletes, from the participation site management table 820, the IP address of the electronic blackboard 2c that has made the participation termination request and the name of the site where the electronic blackboard 2c is installed. Furthermore, the remote connection processing unit 81 outputs the IP address of the electronic blackboard 2c and a report indicating the deletion, to the remote connection result transmitting unit 72 (FIG. 5).

Next, the communication control unit 70 including the remote connection result transmitting unit 72 instructs the communication control unit 60 (FIG. 5) in the client unit 20 (FIG. 5) of the electronic blackboard 2c, to terminate the participation via the communication network 9 (FIG. 1) (step S48). Accordingly, the remote participation processing unit 62 of the communication control unit 60 in the electronic blackboard 2c terminates the participation by performing a participation termination process of disconnecting the communication of the remote sharing process (step S49).

(Determination Example and Modification Example)

Figure 9:
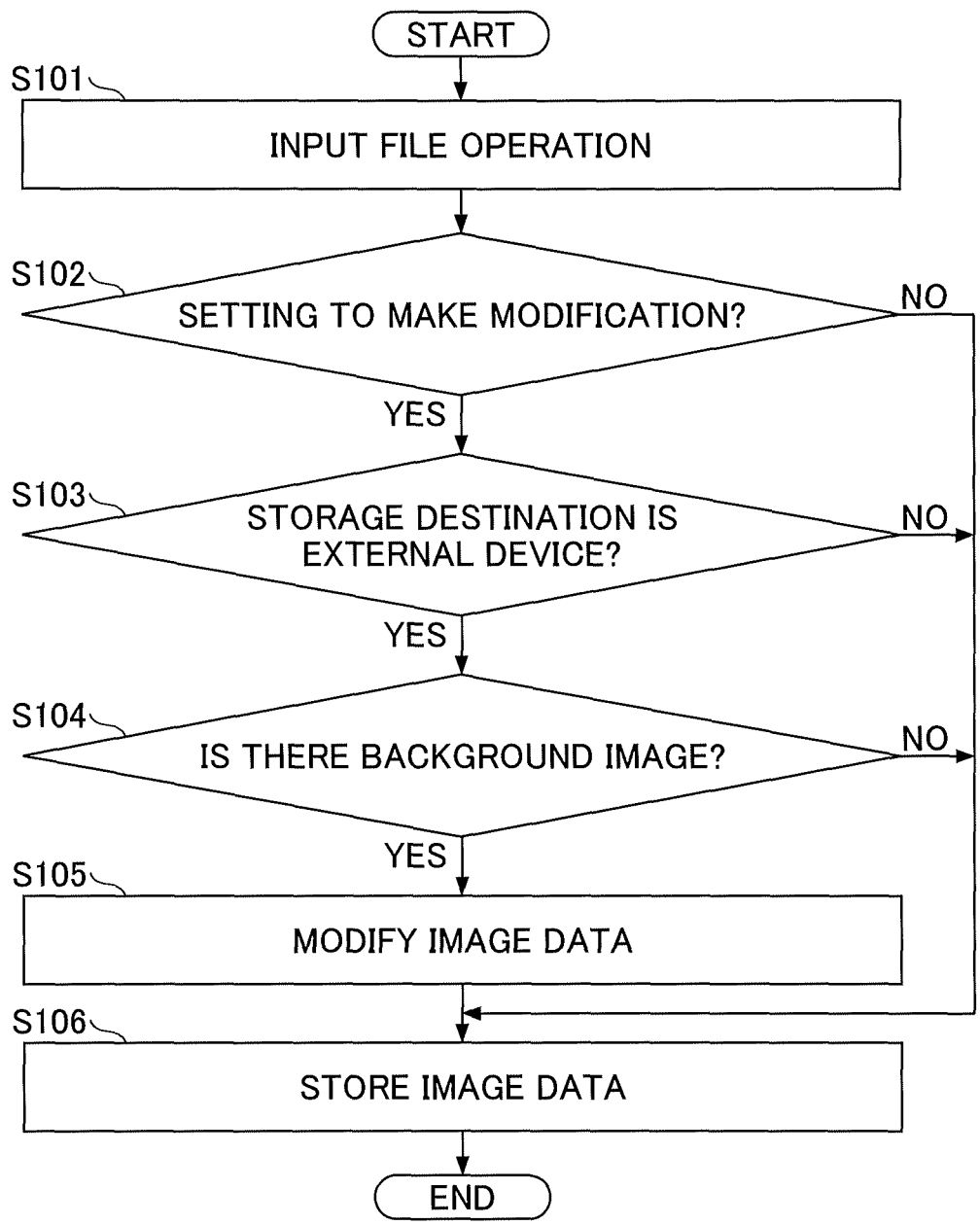
FIG. 9 is a flowchart illustrating an example of a process of determination and modification by the electronic blackboard according to an embodiment of the present invention.

FIG. 9 is a flowchart illustrating an example of a process of determination and modification by the electronic blackboard. Note that the illustrated process is performed, for example, by inputting an operation with respect to image data, etc., generated by the electronic blackboard. More specifically, for example, the process of FIG. 9 is performed after step S32 at the site where the electronic blackboard 2a is installed, or after step S34 at the site where the electronic blackboard 2c is installed, in the process illustrated in FIG. 7, etc. Furthermore, the process illustrated in FIG. 9 is implemented, for example, by the determining unit 20A1 (FIG. 3) and the modifying unit 20A2 (FIG. 3), etc.

In the electronic blackboard, a file operation is input by the user. For example, the file operation is accepted by the electronic blackboard by a Graphical User Interface (GUI) etc., as follows (step S101).

Figure 10:
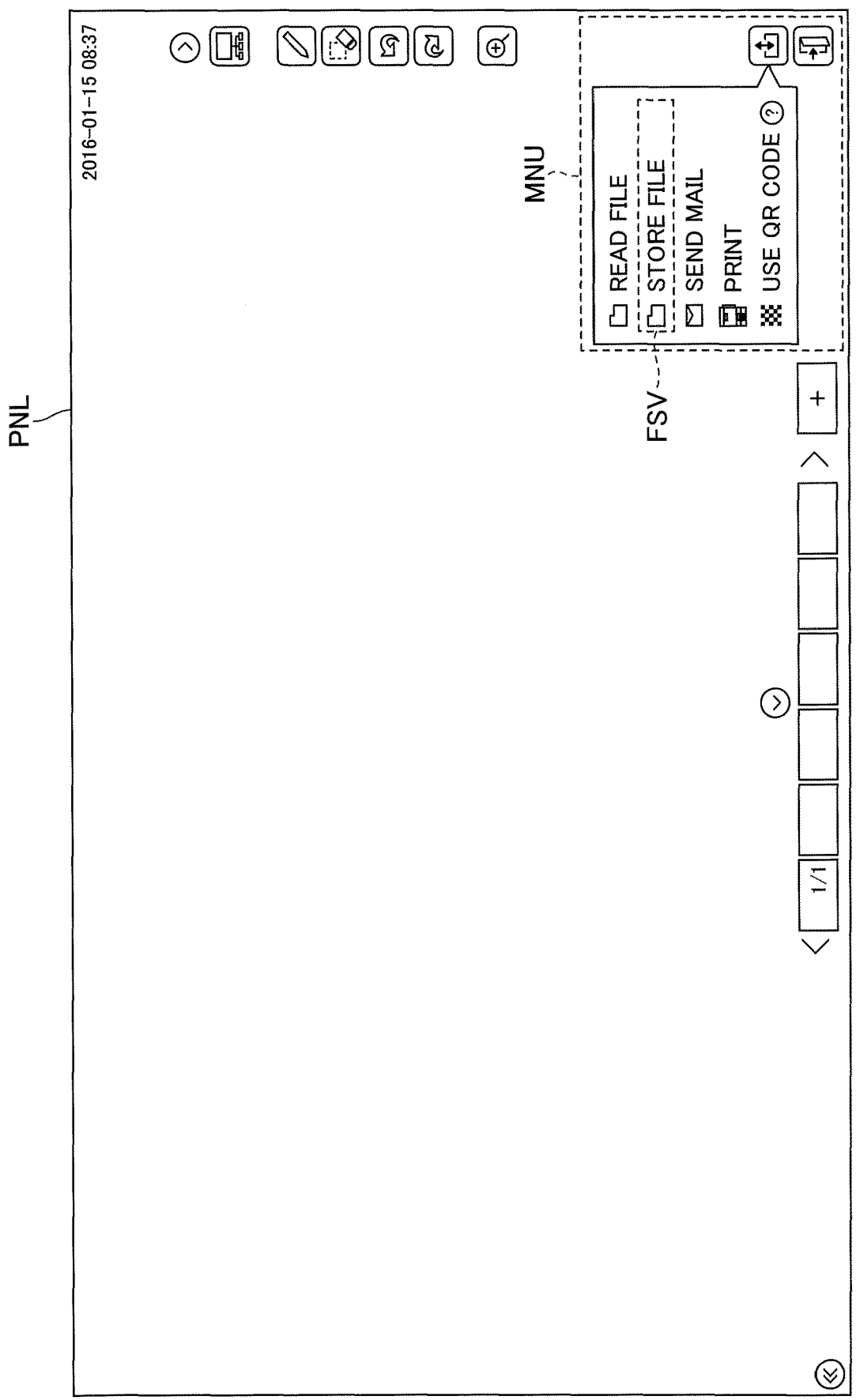
FIG. 10 is an example of a diagram illustrating a file operation menu displayed by the electronic blackboard according to an embodiment of the present invention.

FIG. 10 is an example of a diagram illustrating a file operation menu displayed by the electronic blackboard. For example, the electronic blackboard displays the illustrated screen PNL. Then, the user inputs a file operation in the displayed screen PNL. More specifically, when an icon, etc., for file operation is pressed, the electronic blackboard displays, for example, a file operation menu MNU, etc. Furthermore, when a store file menu FSV is pressed in the menu displayed in the file operation menu MNU, the electronic blackboard starts a process to store image data, etc.

Referring back to FIG. 9, the electronic blackboard determines whether a setting is made to make a modification (step S102). The setting as to whether to make a modification is set in the electronic blackboard by a user's operation, etc. The setting related to the modification will be described in detail later. Furthermore, the modification is, for example, compression of data, etc. Hereinafter, an example in which the modification is compression will be described. Next, when it is determined that a setting is made to make a modification (YES in step S102), the electronic blackboard proceeds to step S103. On the other hand, when it is determined that a setting is made not to make a modification (NO in step S102), the electronic blackboard proceeds to step S106.

Next, the electronic blackboard determines whether the storage destination is an external device (step S103). For example, whether or not the storage destination is an external device is determined by a path indicating a storage destination input at the time of the file operation (step S101). Note that the path is input as follows, for example.

Figure 11:
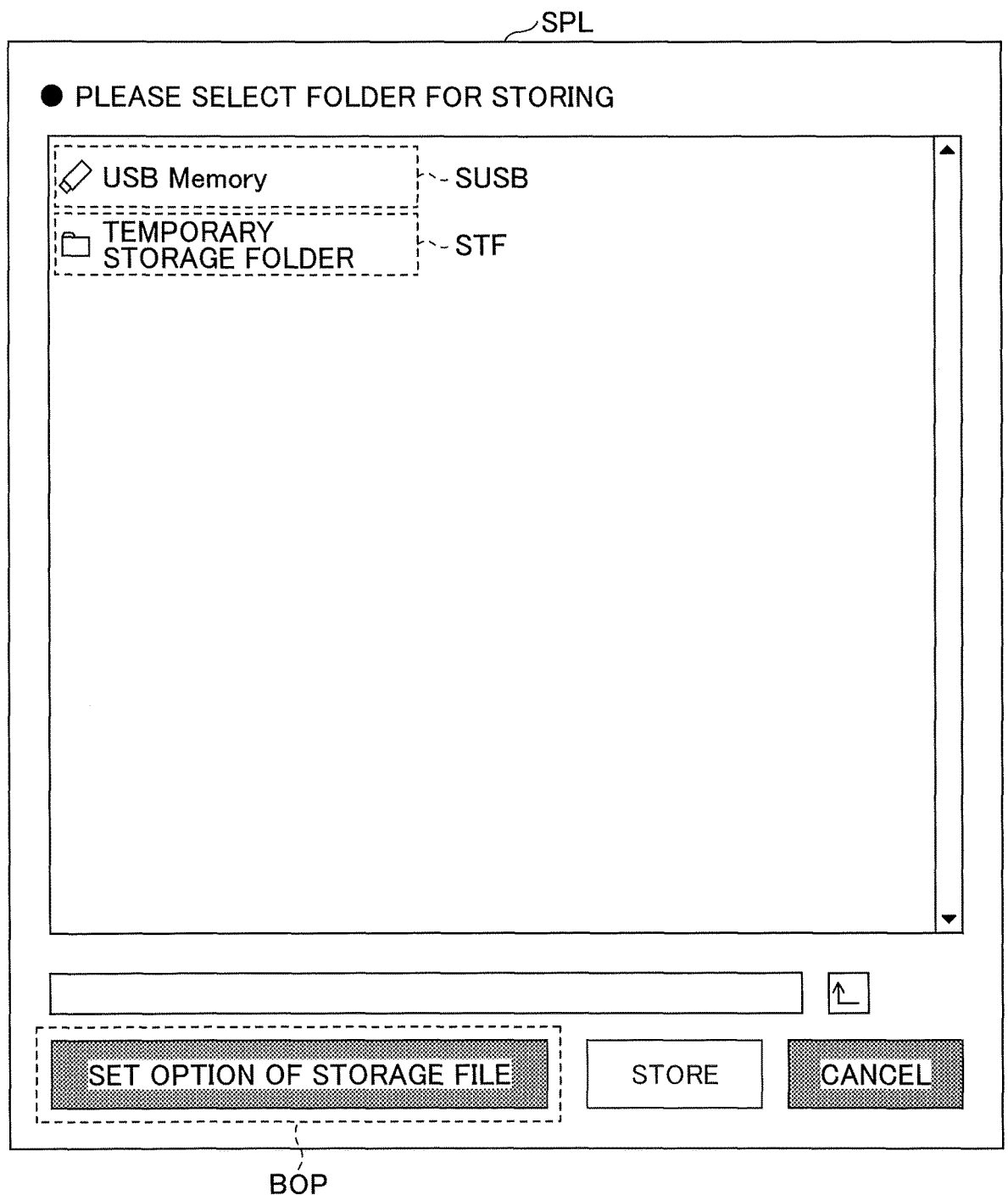
FIG. 11 is an example of a diagram illustrating a GUI to input a storage destination by the file operation according to an embodiment of the present invention.

FIG. 11 is an example of a diagram illustrating a GUI to input a storage destination by the file operation. For example, the electronic blackboard displays a selection screen SPL as illustrated, by the file operation in the screen PNL illustrated in FIG. 10. In this example, the user can select whether the storage destination is to be an external device or within the electronic blackboard (so-called "C drive", etc.) on the selection screen SPL.

Specifically, in the selection screen SPL, when the user selects a USB memory selection SUSB indicated as "USB Memory", the storage destination is set as the USB memory 5 (FIG. 2). On the other hand, in the selection screen SPL, when the user makes an operation of selecting the in-electronic blackboard selection STF indicated as "temporary storage folder", the storage destination is set as the "temporary storage folder" generated in the SSD 104 (FIG. 2). Note that in the example described below, it is assumed that the partition in the SSD 104 (FIG. 2) is set in advance such there is only a "C drive". Therefore, when one of the storage areas in the electronic blackboard is set as the storage destination, such as the "temporary storage folder", the path indicating the storage destination indicates a storage area in the "C drive".

On the other hand, in this example, when an external device such as the USB memory 5 is connected to the electronic blackboard, the external device is set as a drive other than the "C drive". For example, assuming that one of the storage areas in the USB memory 5 is the storage destination, the path indicating the storage destination indicates one of the storage areas in a "D drive".

Note that the "C drive" may be divided into two or more storage areas, for example, into a "C drive" and a "D drive" by partitions. In this manner, for example, a file related to the Operating System (OS) and an application program, etc., are stored in the "C drive". On the other hand, data including the "temporary storage folder" is stored in the "D drive". Furthermore, the storage area may be configured such that the storage destination is the "temporary storage folder", the data is stored in the "D drive", and a link may be made from the storage destination to the "D drive". In such a case, the "C drive" and the "D drive" are the storage areas in the electronic blackboard. Furthermore, the connected external device is, for example, the "E drive", etc. That is, in this case, it is determined that the storage destination other than the "C drive" or the "D drive" is an external device.

In the selection screen SPL illustrated in FIG. 11, when the "store" button is grayed out, and either the USB memory selection SUSB or the electronic blackboard selection STF is selected, the "store" button becomes effective (turns into a state where the button can be pressed). Then, when the "store" button is pressed, the storage destination is determined, and therefore a path indicating the storage destination is determined.

The electronic blackboard determines, for example, whether the storage destination is an external device based on whether the path indicating the determined storage destination indicates a predetermined storage area. The predetermined storage area is set in advance. That is, when the path indicating the storage destination is a "C drive" that is an example of a storage area set in advance, the electronic blackboard determines that the storage destination is not an external device (NO in step S103 illustrated in FIG. 9). On the other hand, when the path indicating the storage destination is other than the "C drive", such as a USB memory, the electronic blackboard determines that the storage destination is an external device (YES in step S103 illustrated in FIG. 9). For example, when a storage area other than a predetermined storage area, is set to be a storage area other than the "C drive", the process will be performed as in the above example.

Note that the external device is not limited to the USB memory. That is, the type of the external device may be a device or a recording medium other than the USB memory. For example, the external device may be a so-called external hard disk etc.

Furthermore, on the selection screen SPL, a setting related to modification may be input. That is, the setting for step S102 illustrated in FIG. 9 may be input with the selection screen SPL. FIG. 11 illustrates an example in which when a modification setting button BOP indicated by "set option of storage file" is pressed, settings related to modification can be input. For example, when the modification setting button BOP is pressed, the following option setting screen is displayed.

Figure 12:
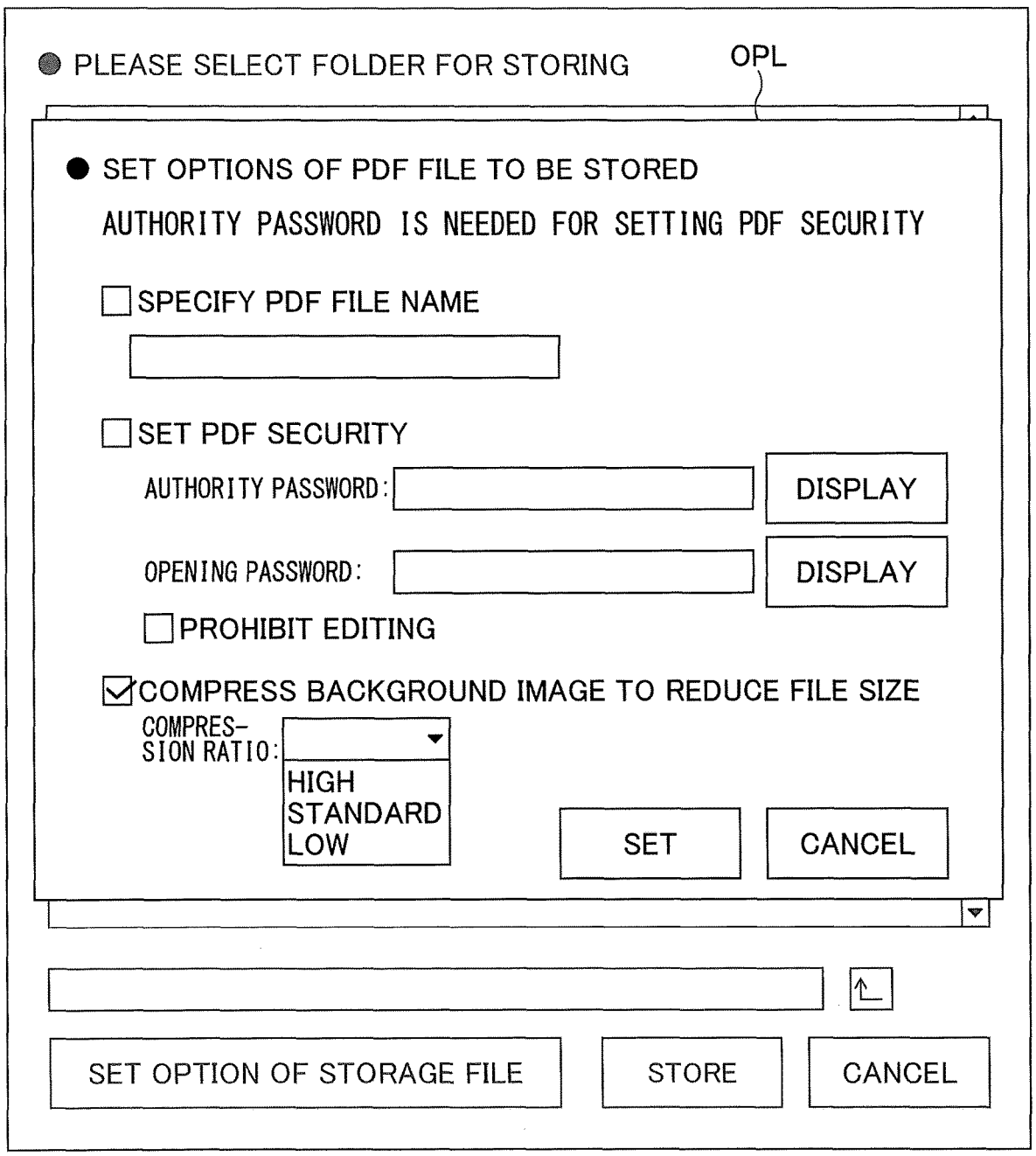
FIG. 12 is an example of a diagram illustrating an option setting screen for inputting a setting related to modification according to an embodiment of the present invention.

FIG. 12 is an example of a diagram illustrating an option setting screen for inputting a setting related to modification. In this example, a setting is made as to whether or not to make a modification, depending on whether or not to tick "compress background image to reduce file size" in the illustrated option setting screen OPL. That is, when "compress background image to reduce file size" is ticked, the electronic blackboard determines that the setting is to make a modification (YES in step S102 illustrated in FIG. 9). On the other hand, when a tick mark is removed from "compress background image to reduce file size", the electronic blackboard determines that the setting is not to make a modification (NO in step S102 illustrated in FIG. 9).

Furthermore, as illustrated in the drawing, "compression ratio", etc., may be input in the setting related to modification. That is, the parameters, etc., related to the modification performed in step S105 illustrated in FIG. 9 may be set in advance. In this way, the user can set "compression ratio", etc., and the electronic blackboard can store image data in a format or a data size desired by the user.

Referring back to FIG. 9, the electronic blackboard determines whether there is a background image in the image data to be stored (step S104). Note that the background image is, for example, the background image (D) illustrated in FIG. 6, etc.

Next, when it is determined that there is a background image (YES in step S104), the electronic blackboard proceeds to step S105. On the other hand, when it is determined that there is no background image (NO in step S104), the electronic blackboard proceeds to step S106.

Next, the electronic blackboard modifies the image data (step S105). For example, the electronic blackboard sets the background image (D) among the images of the respective layers illustrated in FIG. 6 as the target of compression. Not that compression is, for example, Joint Photographic Exports Group (JPEG) compression, etc. Furthermore, the electronic blackboard may make a modification of changing the size and the compression ratio (for example, the Q value) of the image, or a combination of these features of the image.

Hereinafter, an example of a background image of "1280× 720" will be described. In this example, in the option setting screen OPL illustrated in FIG. 12, when "compress background image to reduce file size" is ticked and the "compression ratio" is to be set, the modification is made as follows. Note that the modification is made according to the setting input to the portion of "compression ratio".

"High": The size of each of the vertical and horizontal directions is set so as to be any magnification that satisfies ($0.0 < x \leq 0.7$). Furthermore, the size is set such that the Q value of JPEG satisfies ($0 < y \leq 70$). The compression is performed after these settings are made.

"Standard": The size of each of the vertical and horizontal directions is set so as to be any magnification that satisfies ($0.7 < x \leq 0.9$). Furthermore, the size is set such that the Q value of JPEG satisfies ($70 < y \leq 80$). The compression is performed after these settings are made.

"Low": The size of each of the vertical and horizontal directions is set so as to be any magnification that satisfies ($0.9 < x \leq 1.0$). Furthermore, the size is set such that the Q value of JPEG satisfies ($80 < y < 100$). The compression is performed after these settings are made.

In the above example, the magnification of the size is indicated by "x" and the Q value is indicated by "y". Furthermore, the compression method is not limited to JPEG. That is, the compression method may be another method such as GIF, for example. Furthermore, the modification is not limited to compression, and processing such as thinning out pixels in the Bitmap (BMP) file format or the Tag Image File Format (TIFF), etc., for example, may be performed. Furthermore, the electronic blackboard may further modify the format into a PDF format, etc., after making the modification such as compression.

Next, the electronic blackboard stores the image data in the storage destination input in step S101, etc. (step S106). Note that data other than the image data may be stored together with the image data.

As illustrated in FIG. 6, there are cases where image data, etc., of a superimposed image generated by superimposing the images of the respective layers, is stored in an external storage device such as a USB memory, by a user's file operation, etc. Such image data indicates an image, and therefore the data volume is often large. Therefore, the electronic blackboard modifies the background image, etc., and reduces the volume of the image data. Accordingly, image data having a large data volume can be reduced, so that the storage capacity for storing image data in the external device can be saved.

Furthermore, in the image data illustrated in FIG. 6, it is desirable that the stroke image data, etc., is excluded from the target of modification. The stroke image data, etc., is input to another electronic blackboard, and subsequently, the data indicated by the stroke image data may be edited. Therefore, when modification is performed, especially when irreversible conversion is performed, there are cases where the data necessary for editing is deleted or becomes unusable. Therefore, it is desirable that the data to be the target of modification is the background image data. Accordingly, after inputting image data to another electronic blackboard, etc., via an external device, the stroke image, etc., can be edited, and communication can be made smooth. Furthermore, the background image data often has a large data volume, and therefore if the background image data is modified, the data volume of the image data can be reduced.

Furthermore, when image data is stored in an external device, a code may be input. For example, a code is input in the following code input screen.

FIG. 13 is an example of a diagram illustrating a code input screen for inputting a code. For example, a code input screen CPL is a screen displayed after the selection screen SPL illustrated in FIG. 11. As illustrated in the figure, for example, the user inputs a conference code etc., into the code input text box COD.

In this manner, the input code, that is, "1111" in the example illustrated in FIG. 13, is associated with the image data, etc., to be stored. Furthermore, the electronic blackboard generates table data indicating this association. The table data is stored in an external device together with image data, etc., for example.

With this table data, a codes and image data etc., are associated with each other. That is, when a code is input, the electronic blackboard can identify the image data, etc., based on the table data. Therefore, when a code is input at the time of reading image data, etc., stored in an external device, the electronic blackboard can search for the image data, etc., identified based on the table data. In this manner, predetermined image data, etc., can be distinguished from other image data, etc., and the electronic blackboard can quickly read the predetermined image data, etc.

Furthermore, the above examples are divided according to the main functions to facilitate the understanding of processes by the electronic blackboard 2. Thus the present invention is not limited by how the process units are divided or the names of the process units. For example, the processes of the electronic blackboard 2 may be further divided into many process units according to the process contents. Furthermore, the process units may be divided such that a single process unit further includes many processes.

Furthermore, the image processing apparatus is not limited to a configuration implemented by a single apparatus. That is, embodiments according to the present invention may be implemented by an image processing system including one or more information processing apparatuses. Note that in the image processing apparatus or the image processing system, processing may be performed such that part or all of each processing is distributed, redundant, parallel, or a combination thereof.

Note that all or a part of each processing according to the present invention may be implemented by a program for causing a computer to execute an image processing method described in a programming language, etc. That is, the program is a computer program for causing a computer such as an image processing apparatus to execute an image processing method.

Furthermore, the program can be stored and distributed in a computer-readable recording medium such as a flash memory, a flexible disk, an optical disk, a secure digital (SD) (registered trademark) card, or a magneto-optic disc (MO). Furthermore, the program can be distributed through an electric communication line.

By adopting the above configuration, the image processing apparatus according to an embodiment of the present invention has the effect of reducing the data volume of image data, etc., to be stored in an external device.

The image processing apparatus, the image processing system, and the image processing method are not limited to the specific embodiments described in the detailed description, and variations and modifications may be made without departing from the spirit and scope of the present invention.

Numerous additional modifications and variations are possible in light of the above teachings. It is therefore to be understood that, within the scope of the appended claims, the disclosure of this patent specification may be practiced otherwise than as specifically described herein.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions. the processing circuitry is implemented as at least a portion of a microprocessor. The processing circuitry may be implemented using one or more circuits, one or more microprocessors, microcontrollers, application specific integrated circuits, dedicated hardware, digital signal processors, microcomputers, central processing units, field programmable gate arrays, programmable logic devices, state machines, super computers, or any combination thereof. Also, the processing circuitry may include one or more software modules executable within one or more processing circuits. The processing circuitry may further include memory configured to store instructions and/or code that causes the processing circuitry to execute functions.

If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 101 in a computer system or other system. The machine code may be converted from the source code, etc. If embodied in hardware, each block may represent a circuit or a number of interconnected circuits to implement the specified logical function(s).

What is claimed is:

1. An image processing apparatus for performing image processing on a superimposed image in which a plurality of images are superimposed, the image processing apparatus comprising:
   processing circuitry configured to
      generate the superimposed image by superimposing at least a stroke image input via an operation of a user of the image processing apparatus and a background image;
      determine whether a storage destination, which is for storing image data indicating the superimposed image, is an external device coupled to the image processing apparatus; and
      compress background image data indicating the background image among the image data, and to refrain from compressing stroke image data indicating the stroke image among the image data, in response to the storage destination being determined to be the external device, wherein
   the stroke image is stored as stroke data associated with each image of the plurality of images, and
   the stroke data includes stroke identification information that identifies the stroke data, a start time that indicates a start time of the user operation to input the stroke image, and an end time that indicates an end time of the user operation to input the stroke image.

2. The image processing apparatus according to claim 1, wherein the stroke image is an image indicating one of or any combination of a character, a figure, a number, a symbol, and a line, input by handwriting.

3. The image processing apparatus according to claim 1, wherein the stroke image is displayed in front of the background image.

4. The image processing apparatus according to claim 1, wherein the processing circuitry modifies one of or a combination of a size of the background image and a compression ratio of the background image for compressing the background image data indicating the background image, or thins out pixels included in the background image.

5. The image processing apparatus according to claim 1, wherein the processing circuitry determines whether the storage destination is the external device, based on whether a path indicating the storage destination indicates a predetermined storage area.

6. The image processing apparatus according to claim 5, wherein the processing circuitry determines that the storage destination is the external device, in response to determining that the storage destination is a storage area other than the predetermined storage area.

7. The image processing apparatus according to claim 1, wherein
   the processing circuitry generates table data indicating the image data and a code associated with the image data; and
   identifies the image data based on the table data, in response to the code being input.

8. The image processing apparatus according to claim 4, wherein the processing circuitry performs JPEG compression on the background image data.

9. The image processing apparatus according to claim 1, wherein the background image indicates a plain image, a grid display, a captured image, a document, or a presentation material.

10. The image processing apparatus according to claim 1, wherein the processing circuitry refrains from performing the compression, in response to the storage destination being determined not to be the external device.

11. The image processing apparatus according to claim 1, wherein the processing circuitry determines that the storage destination is not the external device, in response to determining that the storage destination is a temporary storage folder.

12. The image processing apparatus according to claim 1, wherein the processing circuitry performs the compression, in response to a file operation being input with respect to the image data, a setting being made such that the modifier is to perform the compression, the storage destination being determined to be the external device, and the image data including the background image data indicating the background image.

13. An image processing system includes at least one information processing apparatus and performs image processing on a superimposed image in which a plurality of images are superimposed, the image processing system comprising:
   processing circuitry configured to
      generate the superimposed image by superimposing at least a stroke image input via an operation of a user of the image processing apparatus and a background image;
      determine whether a storage destination, which is for storing image data indicating the superimposed image, is an external device coupled to the at least one information processing apparatus; and compress background image data indicating the background image among the image data, and to refrain from compressing stroke image data indicating the stroke image among the image data, in response to the storage destination being determined to be the external device, wherein the stroke image is stored as stroke data associated with each image of the plurality of images, and the stroke data includes stroke identification information that identifies the stroke data, a start time that indicates a start time of the user operation to input the stroke image, and an end time that indicates an end time of the user operation to input the stroke image.

14. An image processing method executed by an image processing apparatus for performing image processing on a superimposed image in which a plurality of images are superimposed, the image processing method comprising:

generating, by the image processing apparatus, the superimposed image by superimposing at least a stroke image input via an operation of a user of the image processing apparatus and a background image;

determining, by the image processing apparatus, whether a storage destination, which is for storing image data indicating the superimposed image, is an external device coupled to the image processing apparatus; and modifying the image data, by the image processing apparatus, by compressing background image data indicating the background image among the image data, and refraining from compressing stroke image data indicating the stroke image among the image data, in response to the storage destination being determined to be the external device at the determining, wherein the stroke image is stored as stroke data associated with each image of the plurality of images, and the stroke data includes stroke identification information that identifies the stroke data, a start time that indicates a start time of the user operation to input the stroke image, and an end time that indicates an end time of the user operation to input the stroke image.

* * * * *